US009391662B2

(12) United States Patent
Kim et al.

(10) Patent No.: US 9,391,662 B2
(45) Date of Patent: Jul. 12, 2016

(54) PORTABLE ELECTRONIC DEVICE, FLIP-TYPE COVER OF THE PORTABLE ELECTRONIC DEVICE, AND METHOD FOR CONTROLLING THE FLIP-TYPE COVER

(71) Applicant: Samsung Electronics Co., Ltd., Gyeonggi-do (KR)

(72) Inventors: Yu-Su Kim, Gyeonggi-do (KR); Sung-Jin Park, Seoul (KR); Kyu-Suk Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 111 days.

(21) Appl. No.: 14/230,382

(22) Filed: Mar. 31, 2014

(65) Prior Publication Data

US 2014/0323182 A1   Oct. 30, 2014

(30) Foreign Application Priority Data

Apr. 30, 2013 (KR) .................. 10-2013-0048377
Dec. 19, 2013 (KR) .................. 10-2013-0158948

(51) Int. Cl.
| *H04M 1/00* | (2006.01) |
| *H04B 1/3888* | (2015.01) |
| *G06F 1/16* | (2006.01) |
| *H04M 1/725* | (2006.01) |
| *H04M 1/02* | (2006.01) |
| *H04M 1/18* | (2006.01) |

(52) U.S. Cl.
CPC ............ *H04B 1/3888* (2013.01); *G06F 1/1616* (2013.01); *G06F 1/1647* (2013.01); *H04M 1/72527* (2013.01); *H04M 1/0274* (2013.01); *H04M 1/185* (2013.01); *H04M 2250/16* (2013.01)

(58) Field of Classification Search
CPC . H04M 1/021; H04M 1/0214; H04M 1/0218; H04M 1/2016; H04M 1/0266; H04M 1/2068
USPC .................................................. 455/575.1, 3
See application file for complete search history.

(56) References Cited

U.S. PATENT DOCUMENTS

| 5,915,020 | A | 6/1999 | Tilford et al. |
| 6,404,643 | B1 | 6/2002 | Chung |
| 6,535,199 | B1 * | 3/2003 | Canova, Jr. ........... G06F 1/1626 345/156 |
| 7,009,846 | B1 * | 3/2006 | Wang .................... H05K 5/0286 235/492 |
| 7,864,134 | B2 * | 1/2011 | Kim ...................... G06F 3/1431 345/1.1 |

(Continued)

FOREIGN PATENT DOCUMENTS

| EP | 2 031 918 | 3/2009 |
| JP | 3178107 | 8/2012 |

(Continued)

*Primary Examiner* — Wen Huang
(74) *Attorney, Agent, or Firm* — The Farrell Law Firm, P.C.

(57) ABSTRACT

A portable electronic device and a flip-type cover of the portable electronic device are provided. The flip-type cover includes a front cover, a rear cover configured to be detachably engaged with a rear surface of the portable electronic device, a connection cover configured to connect the front cover to the rear cover, a display screen disposed in the front cover, and a rear-cover Printed Circuit Board (PCB) mounted to the rear cover and connected to the portable electronic device, to receive data from the portable electronic device. If the flip-type cover is engaged with the portable electronic device, the rear-cover PCB transmits data received from the portable electronic device to the display screen.

52 Claims, 37 Drawing Sheets

(56) References Cited

U.S. PATENT DOCUMENTS

| | | | |
|---|---|---|---|
| 2003/0071791 A1* | 4/2003 | Hanson | G06F 1/1601 345/169 |
| 2004/0117553 A1* | 6/2004 | Kurakata | G06K 19/0701 711/115 |
| 2008/0297991 A1 | 12/2008 | Ou | |
| 2009/0177816 A1* | 7/2009 | Marx | G06F 13/1668 710/72 |
| 2010/0022277 A1* | 1/2010 | An | H04M 1/72527 455/566 |
| 2010/0188807 A1 | 7/2010 | Alameh et al. | |
| 2010/0235560 A1* | 9/2010 | Oh | H04M 1/0266 710/301 |
| 2011/0065474 A1 | 3/2011 | Won et al. | |
| 2011/0096472 A1 | 4/2011 | Rodgers et al. | |
| 2012/0092044 A1* | 4/2012 | Lien | G06F 13/4081 327/142 |
| 2012/0243163 A1* | 9/2012 | Kim | H05K 7/00 361/679.15 |
| 2012/0325838 A1 | 12/2012 | Huang | |
| 2014/0159839 A1 | 6/2014 | Kim | |

FOREIGN PATENT DOCUMENTS

| | | |
|---|---|---|
| KR | 1020080047938 | 5/2008 |
| KR | 1020130018393 | 2/2013 |

* cited by examiner

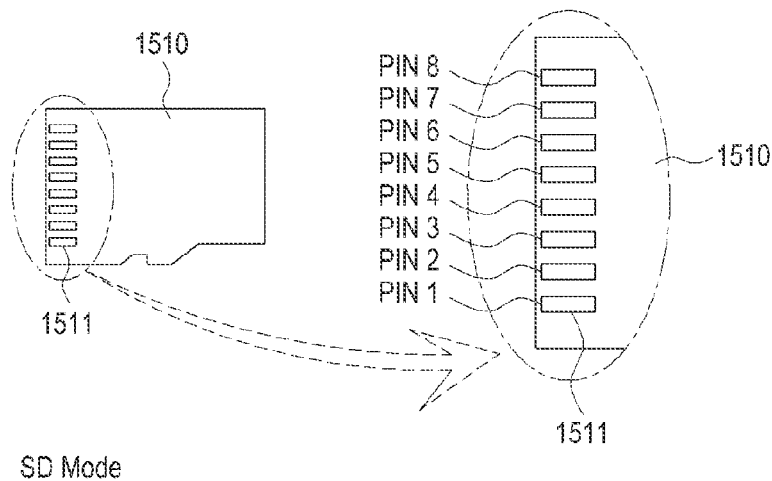

SD Mode

| Pin No. | Name | Type | Description |
|---|---|---|---|
| 1 | DAT2 | I/O/PP | Data Line (bit 2) |
| 2 | CD/DAT3 | I/O/PP | Card Detect/Data line (Bit 3) |
| 3 | CMD | PP | Command Response |
| 4 | VDD | S | Supply Voltage |
| 5 | CLK | I | Clock |
| 6 | VSS | S | Supply Voltage Ground |
| 7 | DAT0 | I/O/PP | Data Line (bit 0) |
| 8 | DAT1 | I/O/PP | Data Line (bit 1) |

SPI Mode

| Pin No. | Name | Type | Description |
|---|---|---|---|
| 1 | RSV | - | - |
| 2 | CS | I | Chip Select (neg true) |
| 3 | DI | I | Data in |
| 4 | VDD | S | Supply Voltage |
| 5 | SCLK | I | Clock |
| 6 | VSS | S | Supply Voltage Ground |
| 7 | DO | O/PP | Data Out |
| 8 | RSV | - | - |

FIG.21

PORTABLE ELECTRONIC DEVICE, FLIP-TYPE COVER OF THE PORTABLE ELECTRONIC DEVICE, AND METHOD FOR CONTROLLING THE FLIP-TYPE COVER

PRIORITY

This application claims priority under 35 U.S.C. §119(a) to a Korean Patent Application filed in the Korean Intellectual Property Office on Apr. 30, 2013 and assigned Serial No. 10-2013-0048377, and a Korean Patent Application filed in the Korean Intellectual Property Office on Dec. 19, 2013 and assigned Serial No. 10-2013-0158948, the entire disclosure of which each of which is incorporated herein by reference.

BACKGROUND

1. Field of the Invention

The present invention relates generally to a portable electronic device, a flip-type cover of the portable electronic device, and a method for controlling the flip-type cover, and more particularly, to a flip-type cover with a display, mountable in a portable electronic device and a portable electronic device that controls the flip-type cover.

2. Description of the Related Art

Covers formed of a flexible material such as jelly, plastic, rubber, leather, or fabric have been introduced to cover at least a part of a portable electronic device such as a smartphone, a tablet Personal Computer (PC), and the like. A cover protects a portable electronic device against damage caused by scratches or impact. The cover also has become a fashion accessory that a user chooses according to the user's preferences.

For example, covers for portable electronic devices may be categorized into a case-type cover that covers the side and rear surfaces of a portable electronic device, while exposing the front surface of the portable electronic device having a screen, a container-type cover that contains a portable electronic device, and a flip-type cover that is engaged with the rear or side surfaces of a portable electronic device and has a lid protecting the front surface of the portable electronic device having a screen.

While the case-type cover allows a user to directly access a screen of a portable electronic device, the case-type cover may perform less than the flip-type cover in terms of screen protection. The flip-type cover protects the front surface of a portable electronic device but a user additionally needs to open or close the lid of the flip-type cover while or after using the portable electronic device.

Accordingly, there is a need for a cover that enables more convenient and more efficient use of a portable device as well as protects the exterior of the portable device and enhances the appearance of the portable device, and a portable device with the cover.

SUMMARY

The present invention has been made to address at least the above-mentioned problems and/or disadvantages and to provide at least the advantages described below. Accordingly, an aspect of the present invention is to provide a flip-type cover having a display screen to reinforce a display function of a portable electronic device, and a portable electronic device that operates in conjunction with the flip-type cover.

Another aspect of the present invention is to provide a portable electronic device and a flip-type cover of the portable electronic device, which has an interface readily connectable to the portable electronic device.

Another aspect of the present invention is to provide a portable electronic device and a flip-type cover of the portable electronic device, which is connectable to the portable electronic device by extending a plurality of cards or modules using a general-purpose interface of the portable electronic device.

Another aspect of the present invention is to provide a portable electronic device and a flip-type cover of the portable electronic device, which is configured to be mounted in a reduced size in the portable electronic device.

Another aspect of the present invention is to provide a flip-type cover that has a display module controllable by a host controller of a portable electronic device and that has a memory card socket into which a memory card controllable by the host controller of the portable electronic device is inserted.

In accordance with an aspect of the present disclosure, there is provided a flip-type cover in a portable electronic device, including a front cover, a rear cover configured to be detachably engaged with a rear surface of the portable electronic device, a connection cover configured to connect the front cover to the rear cover, a display screen disposed in the front cover, and a rear-cover Printed Circuit Board (PCB) mounted to the rear cover and connected to the portable electronic device, to receive data from the portable electronic device. If the flip-type cover is engaged with the portable electronic device, the rear-cover PCB transmits data received from the portable electronic device to the display screen.

In accordance with another aspect of the present invention, there is provided a portable electronic device including a housing, a host display screen disposed on a front surface of the housing, a host PCB connected to the host display screen, and a flip-type cover configured to be detachably engaged with a rear surface of the housing. The flip-type cover includes a front cover, a rear cover configured to be detachably engaged with the rear surface of the housing, a connection cover configured to connect the front cover to the rear cover, a display screen disposed in the front cover, and a rear-cover PCB mounted to the rear cover and connected to the host PCB, to receive data from the portable electronic device. If the flip-type cover is engaged with the host PCB, the rear-cover PCB transmits data received from the host PCB to the display screen.

In accordance with another embodiment of the present invention, there is provided a portable electronic device including a housing, a host display screen disposed on a front surface of the housing, a host controller inside the housing, an SDIO memory card socket mounted on a rear surface of the housing, and a flip-type cover configured to be detachably engaged with the rear surface of the housing. The flip-type cover includes a front cover, a rear cover configured to be detachably engaged with the rear surface of the housing, a connection cover configured to connect the front cover to the rear cover, a display screen disposed in the front cover, and a memory card connector disposed in correspondence with the memory card socket. The host controller controls display of data on the host display screen and the display screen of the flip-type cover.

In accordance with another embodiment of the present invention, there is provided a flip-type cover in a portable electronic device, including a front cover, a rear cover connected to the front cover and configured to be detachably engaged with a rear surface of the portable electronic device, a rear-cover PCB mounted to the rear cover and connected electrically to the portable electronic device, to receive data from the portable electronic device, and a display screen disposed in the front cover. The received data is switched to at least one of the display screen disposed in the front cover and a memory card mounted to the rear cover by a host controller of the portable electronic device.

In accordance with another embodiment of the present invention, there is provided a method for controlling a flip-type cover in a portable electronic device, including detecting a voltage level of a memory card or a connector of the flip-type cover inserted into a memory card socket of the portable electronic device, determining whether the memory card or the connector has been inserted based on the detected voltage level, and determining a data transmission mode based on an SDIO standard according to the determination.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 21 illustrates pin maps for Secure Data (SD) mode and SPI mode defined in a Secure Digital Input Output (SDIO) standard along with an embodiment of the present invention;

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as merely examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their dictionary meanings, but, are merely used to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1A:
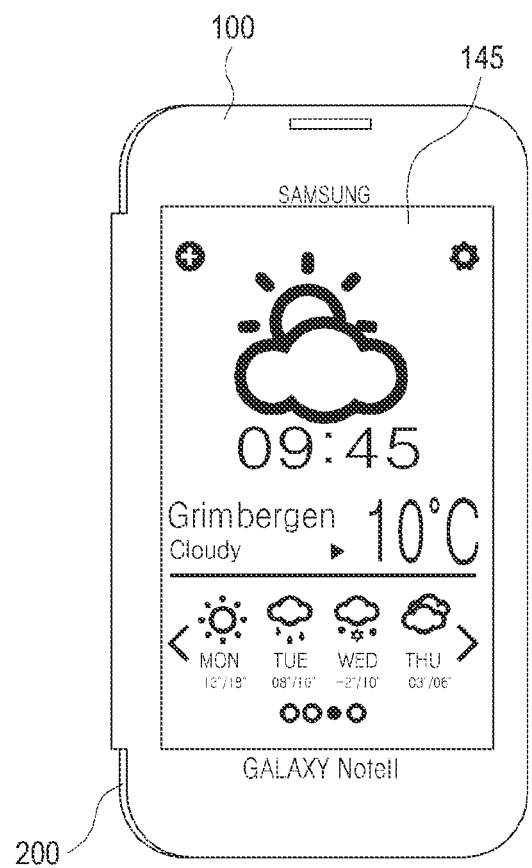
FIGS. 1A, 1B, and 1C illustrate a flip-type cover engaged with a portable electronic device according to an embodiment of the present invention.
Figure 1B:
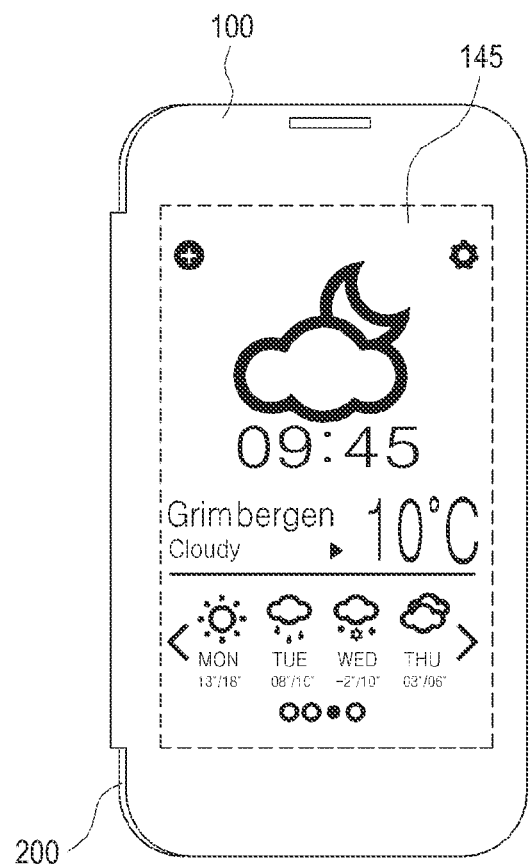
Figure 1C:
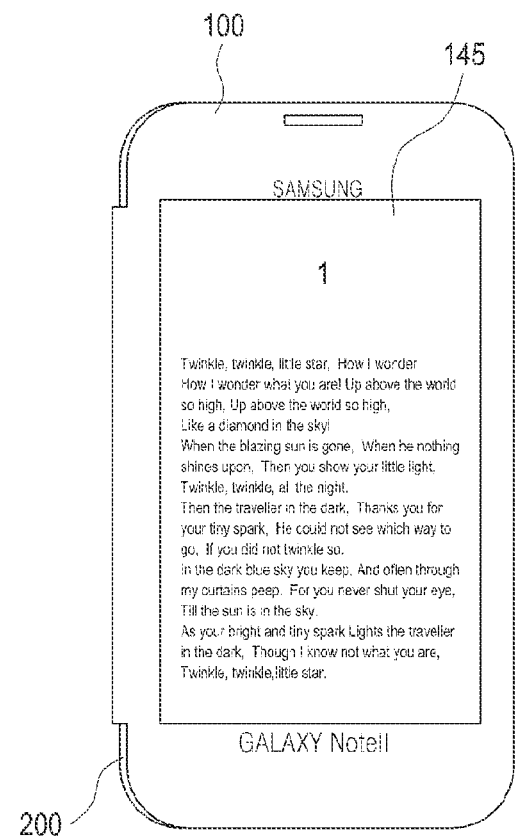

FIGS. 1A, 1B, and 1C illustrate a flip-type cover engaged with a portable electronic device according to an embodiment of the present invention.

Referring to FIGS. 1A, 1B, and 1C, a portable electronic device 200 may be any electronic device including a portable phone, smart phone, laptop computer, tablet Personal Computer (PC), e-book reader, digital broadcasting terminal, Personal Digital Assistant (PDA), Portable Multimedia Player (PMP), navigator, wearable terminal, and the like. It will be apparent to those of ordinary skill in the art that the portable electronic device 200 according to the embodiment of the present invention is not limited to the aforementioned devices.

A flip-type cover 100 may be engaged with the portable electronic device 200. The flip-type cover 100 is connected electrically to the portable electronic device 200. A display module of the flip-type cover 100 includes a display screen 145. When the flip-type cover 100 is engaged with the portable electronic device 200, the flip-type cover 100 displays data received from the portable electronic device 200 on the display screen 145.

For example, if the display screen 145 is disposed to be exposed on an outer surface of the flip-type cover 100, a user may readily view information provided by the portable electronic device 200 on the display screen 145 without a user manipulation of opening a front cover of the flip-type cover 100 and turning on a host display module.

The display module of the flip-type cover 100 may be configured as a reflective display with low power consumption such as an ElectroPhoretic Display (EPD). For example, the EPD may maintain and change an image displayed on an EPD screen with low power. Referring to FIGS. 1A and 1B, if the EPD is included in the flip-type cover 100, a clock, weather, news, stock information, and the like are displayed continuously on the EPD screen in every predetermined time period or upon generation of an information update-triggering event. One of home screens of the portable electronic device 200 may be displayed on the display screen 145 illustrated in FIGS. 1A and 1B. When the flip-type cover 100 is engaged with the portable electronic device 200, a home screen may be generated additionally and displayed on the display screen 145. Referring to FIG. 1A, the outline of the display screen 145 may be visible by rendering a background of the display screen 145 and the front cover of the flip-type cover 100 in different colors or forming the display screen 145 and the front cover of the flip-type cover 100 of different materials. Referring to FIG. 1B, the outline of the display screen 145 may not be visible by rendering the background of the display screen 145 and the front cover of the flip-type cover 100 in similar colors or forming the display screen 145 and the front cover of the flip-type cover 100 of similar materials.

Referring to FIG. 1C, an e-book may be displayed on the display screen 145 of the flip-type cover 100. The portable electronic device 200 executes an e-book application and transmits display information about the e-book to the display screen 145. The e-book application may provide various User Interfaces (UIs), such as a UI for book selection, page turning, and the like through manipulation of a button or a touch panel in the portable electronic device 200, and motion sensing or voice recognition of the portable electronic device 200, or the like. For example, when the front cover of the flip-type cover 100 covers a host display screen of the host display module of the portable electronic device 200, the portable electronic device 200 may recognize a touch gesture on the display screen 145 including a hovering touch function of a touch panel combined with the host display module.

Further, the display module of the flip-type cover 100 may be activated or deactivated according to a user manipulation and the display screen 145 of the display module may be kept active so that data or information is always displayed on the display screen 145. If the flip-type cover 100 is engaged with the portable electronic device 200, the host display module of the portable electronic device 200 may be active or inactive as it was before the engagement of the flip-type cover 100, by a user manipulation. In the absence of a user manipulation, the host display module of the portable electronic device 200 may be deactivated automatically a predetermined time later, for power saving.

The portable electronic device 200 senses opening or closing of the front cover of the flip-type cover 100. When the front cover of the flip-type cover 100 is closed (or the front cover of the flip-type cover 100 covers the host display screen), even though the portable electronic device 200 is in an active state where it may receive a user manipulation, the host display module may be kept in an inactive state. For example, if an e-book is displayed on the display screen 145 of the front cover of the flip-type cover 100 in closed state, the portable electronic device 200 deactivates the host display module and thus turns off the host display module. Then the portable electronic device 200 senses a user input from the touch panel or a button to provide a UI in relation to the e-book application to the user. Opening or closing of the front cover of the flip-type cover 100 may be sensed by means of a proximity sensor, a camera, or the like in the portable electronic device 200. To determine whether the front cover of the flip-type cover 100 is closed to the portable electronic device 200, a magnet and a magnetic sensor may be used.

Figure 2:
FIG. 2 illustrates a flip-type cover engaged with a portable electronic device, with a front cover of the flip-type cover opened according to an embodiment of the present invention.

FIG. 2 illustrates a flip-type cover engaged with a portable electronic device, with a front cover of the flip-type cover opened according to an embodiment of the present invention.

When the front cover of the flip-type cover 100 is opened, the host display screen of the portable electronic device 200 is exposed. Since the display screen of the flip-type cover 100 is positioned on the exterior of the front cover, if the front cover is opened, the display screen of the flip-type cover 100 is hidden by an inner surface of the front cover.

In another embodiment of the present disclosure, the display screen of the flip-type cover 100 may be disposed on the inner surface of the front cover or on both the inner and outer surfaces of the front cover.

Figure 3A:
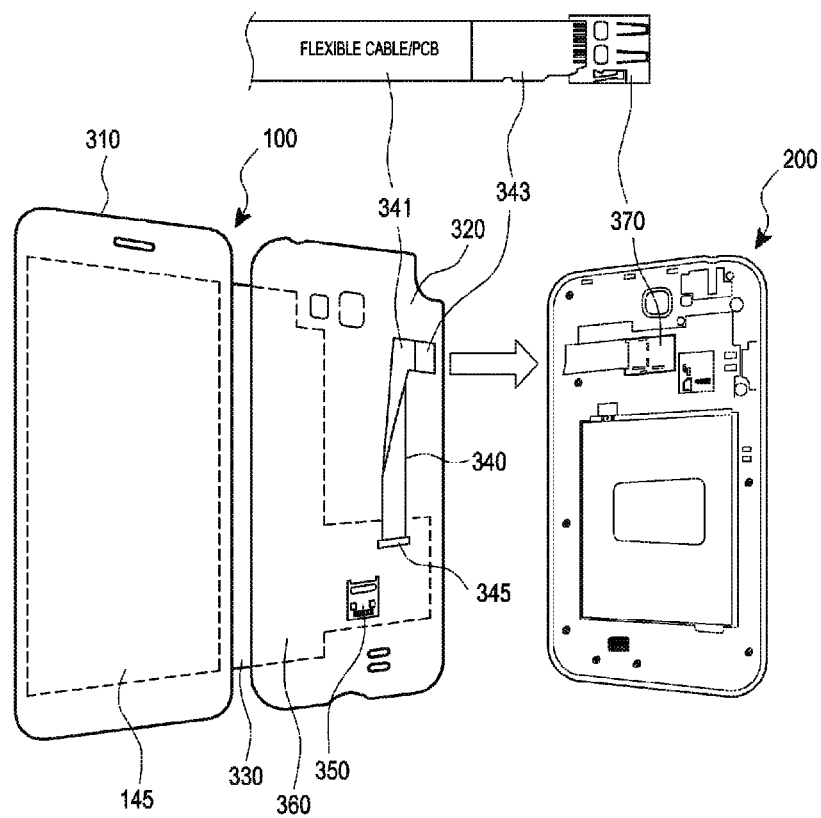
FIG. 3A illustrates engagement of a flip-type cover with a portable electronic device according to an embodiment of the present invention.

FIG. 3A illustrates engagement of a flip-type cover with a portable electronic device according to an embodiment of the present invention.

Referring to FIG. 3A, the flip-type cover 100 includes a front cover 310, a rear cover 320 detachably engaged with a rear surface of the portable electronic device 200, and a connection cover 330 that connects the front cover 310 to the rear cover 320.

The flip-type cover 100 further includes the display screen 145 in the front cover 310 and a rear-cover Printed Circuit Board (PCB) 360 that is mounted in the rear cover 320 and connected to the portable electronic device 200 to receive data from the portable electronic device 200. When the flip-type cover 100 is engaged with the portable electronic device 200, the rear-cover PCB 360 transmits data received from the portable electronic device 200 to the display screen 145.

FIG. 3A illustrates a rear surface of the display screen 145 as viewed from the direction of the inner surface of the front cover 310 of the flip-type cover 100. The display panel may be covered by a finishing member of the rear cover 320. If the display panel is formed of a material that can protect the host display screen, the rear surface of the display screen 145 may be exposed from the inner surface of the front cover 310.

The flip-type cover 100 further includes a connector 340 that connects the rear-cover PCB 360 to the portable electronic device 200. The connector 340 is disposed in correspondence with a socket 370 installed on the rear surface of the portable electronic device 200. The socket 370 may be a memory card socket for a Secure Digital (SD) card, a micro SD card, a mini SD card, or the like. For example, the socket 370 illustrated in FIG. 3A is for a micro SD card.

The connector 340 includes a stub 343 formed in the same shape as a memory card so that the stub 343 is insertable into the socket 370 and a flexible PCB (or flexible cable) 341 that connects the rear-cover PCB 360 to the stub 343. A plurality of connection pins corresponding to a plurality of socket pins of the socket 370 are installed on a rear surface (not shown) of the stub 343. The connector 340 further includes a connector connection member 345 that connects the rear-cover PCB 360 to the flexible PCB (or flexible cable) 341. The connector connection member 345 includes a connection terminal to connect the rear-cover PCB 360 to the connector 340. Therefore, the rear-cover PCB 360 and the connector 340 may be connected to each other, for example, by means of a male/female socket and the connector connection member 345.

Data may be received from the portable electronic device 200 via a Secure Digital Input Output (SDIO) interface. Accordingly, the socket 370 and the connector 340 may be fabricated in conformance with an SDIO standard.

When the rear-cover PCB 360 is connected to a host PCB (not shown) of the portable electronic device 200 through the connector 340 and the socket 370 as illustrated in FIG. 3A, the flip-type cover 100 receives power and data or information from the portable electronic device 200.

Figure 3B:
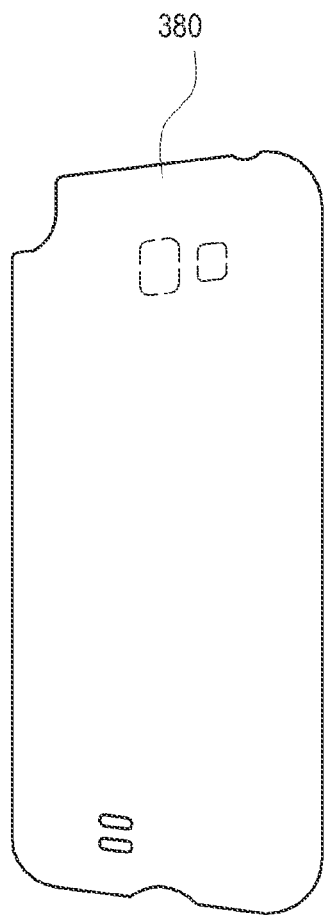
FIG. 3B illustrates a battery cover in a portable electronic device according to an embodiment of the present invention.

In consideration of user convenience, durability, or size, the rear cover 320 of the flip-type cover 100 may be mounted onto the rear surface of the portable electronic device 200. In an embodiment of the present invention, the rear cover 320 of the flip-type cover 100 may be substituted for a battery cover of the portable electronic device 200. For example, FIG. 3B illustrates a battery cover 380 that has been removed from the rear surface of the portable electronic device 200.

Serving as a battery cover for the portable electronic device 200, the flip-type cover 100 may be fabricated as a package with the portable electronic device 200 that does not include the battery cover 380. The portable electronic device 200 may also include the battery cover 380 and the flip-type cover 100 as a package.

The rear-cover PCB 360 includes a controller (not shown) that controls transmission of data received from the portable electronic device 200 to the display screen 145.

The flip-type cover 100 further includes a memory card socket 350 installed on the rear cover 320. As the flip-type cover 100 is provided with the memory card socket 350, the socket 370 of the portable electronic device 200 may be used to connect the flip-type cover 100 to the portable electronic device 200 and a memory card may be inserted into the memory card socket 350 instead of the socket 370, for use by the portable electronic device 200.

The controller of the flip-type cover 100 switches data received from the portable electronic device 200 to at least one of the display screen 145 and the memory card socket 350. For example, the controller of the flip-type cover 100 may use a routing logic so that data received from the portable electronic device 200 may be transferred to a card (or module) indicated by the portable electronic device 200. The controller may include a register (or memory) that stores an address table listing addresses or numbers of cards (or modules). In addition, the controller may include a buffer for temporarily storing data received from the portable electronic device 200 and a circuit and a processor to select a route to a destination of data using the address table of the register. The controller may further include a demultiplexer or a multiplexer, for connection and selection between a plurality of cards (or modules).

The flip-type cover 100 further includes various modules or cards according to their usages, or slots (or sockets) for accommodating the modules or cards. For example, the flip-type cover 100 may support 8 slots according to the SDIO standard. If a manufacturer of the flip-type cover 100 customizes the controller of the flip-type cover 100, a plurality of slots may be supported by the flip-type cover 100, without any hardware modification to a general interface control module supporting the SDIO standard in the portable electronic device 200.

The controller of the flip-type cover 100 may access register maps of a display panel (or display module) having the display screen 145 and a memory card inserted into the memory card socket 350. The controller acquires hardware information, identification information, manufacturer (or manufacturing company) information, capability information, detailed information, or the like about a module or a card from its register map and transmits the acquired information to the portable electronic device 200. A host driver of the portable electronic device 200 invokes a driver of the module or card using the information received from the flip-type cover 100 and controls an operation of the driver. When the driver of the module or card operates, the portable electronic device 200 establishes a data link to use the module or card of the flip-type cover 100, or resets a control function.

Figure 4A:
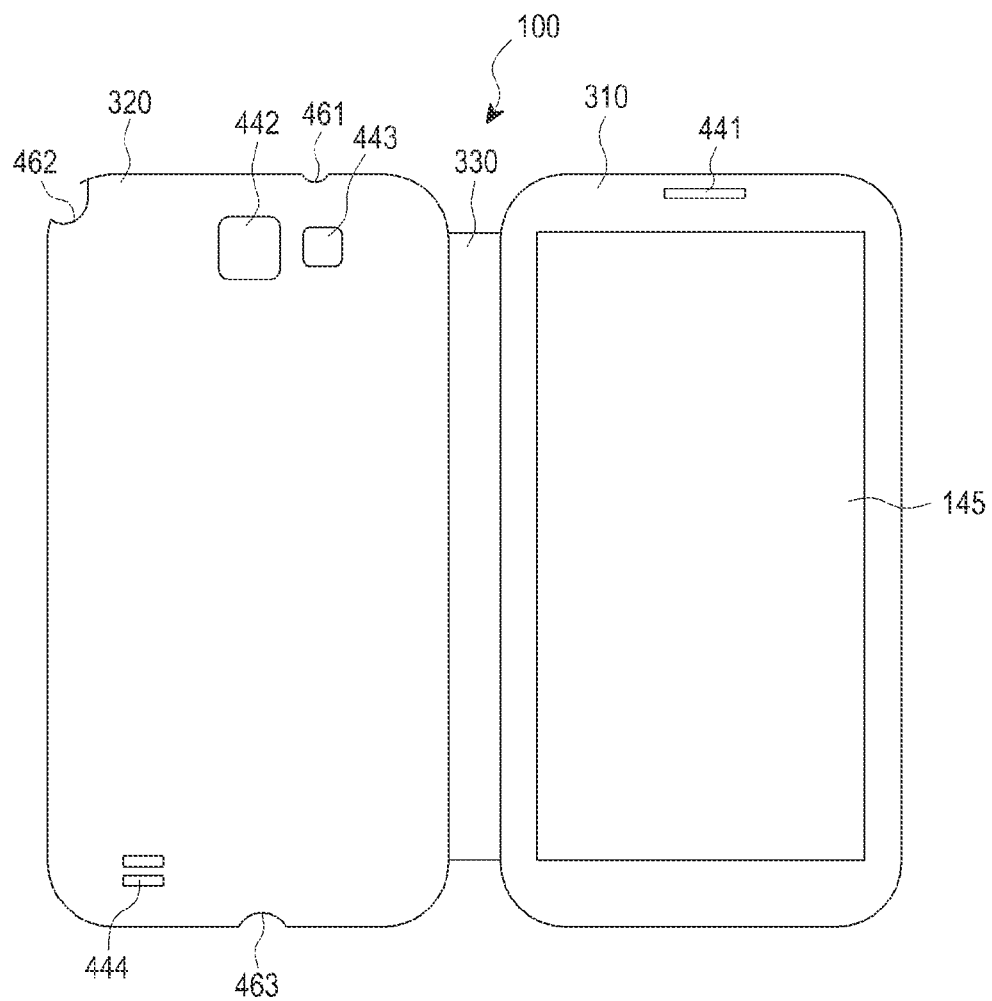
FIG. 4A illustrates the exterior of a flip-type cover according to an embodiment of the present invention.

FIG. 4A illustrates the exterior surface of a flip-type cover according to an embodiment of the present invention.

Referring to FIG. 4A, the display screen 145 is disposed on the outer surface of the front cover 310. That is, if the rear cover 320 is engaged with the portable electronic device 200 and the front cover 310 covers the host display screen of the portable electronic device 200, the display screen 145 is positioned on the exposed surface of the front cover 310.

A hole 441 is formed in the front cover 310 at a position corresponding to a speaker of the portable electronic device 200.

A hole 442 corresponding to a camera of the portable electronic device 200, a hole 443 corresponding to a flash of the portable electronic device 200, or a hole 444 corresponding to the speaker of the portable electronic device 200 are formed in the rear cover 320. In addition, an opening 461 corresponding to an earphone interface of the portable electronic device 200, an opening 462 corresponding to a Digital Multimedia Broadcasting (DMB) antenna of the portable electronic device 200, or an opening 463 corresponding to an interface such as a Universal Serial Bus (USB) for wired data communication and power supply for the portable electronic device 200 may be formed in the rear cover 320.

The connection cover 330 connects the front cover 310 to the rear cover 320 and has a built-in cable or flexible PCB to connect the display screen 145 to the rear-cover PCB 360.

Figure 4B:
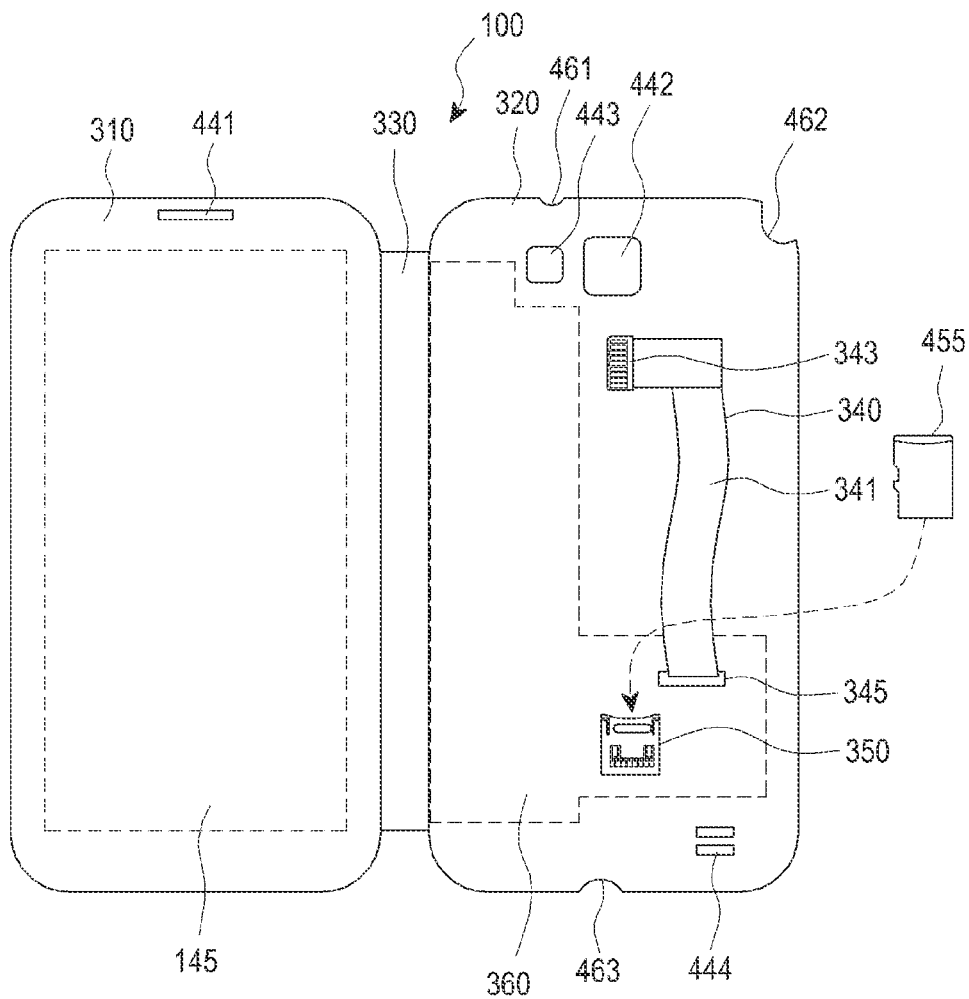
FIGS. 4B and 4C illustrate interiors of a flip-type cover according to embodiments of the present invention.
Figure 4C:
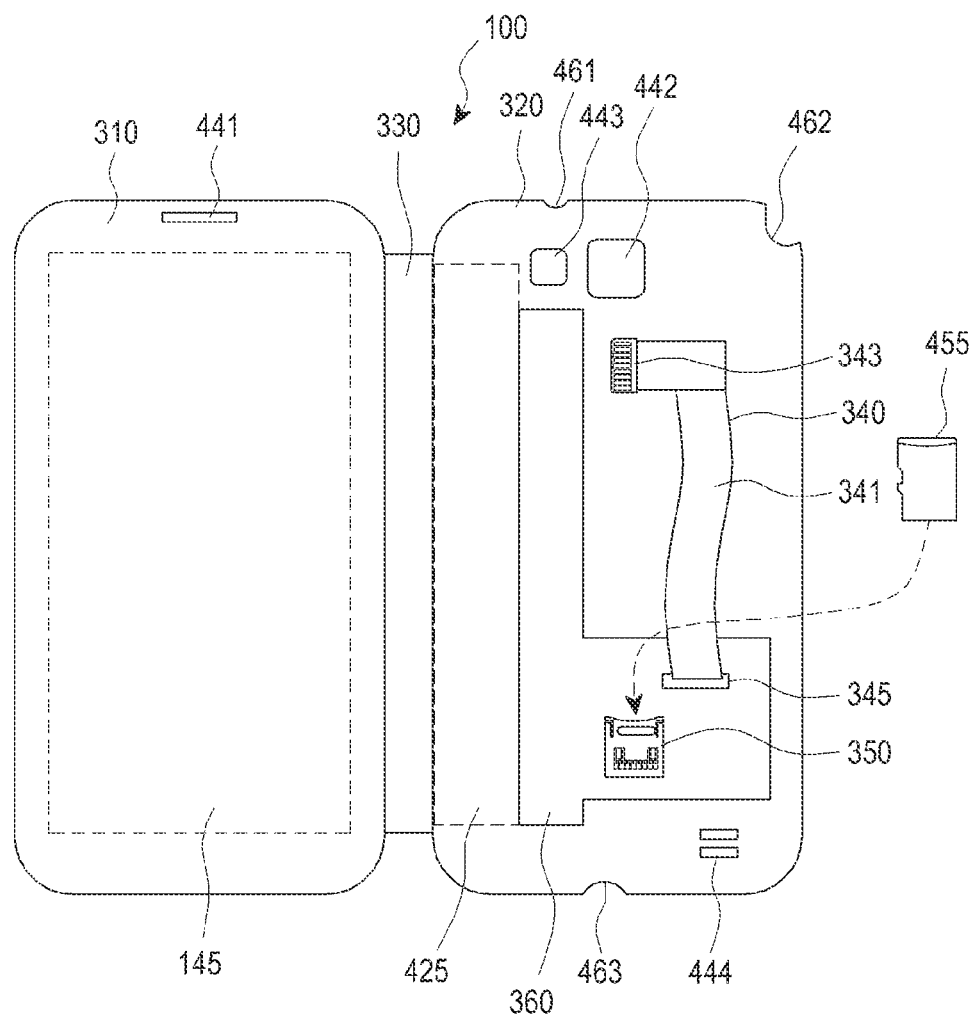

FIGS. 4B and 4C illustrate interior surfaces of a flip-type cover according to embodiments of the present invention.

Referring to FIGS. 4B and 4C, the rear surface of the display screen 145 is viewed from the direction of the inner surface of the front cover 310 of the flip-type cover 100.

In FIG. 4B, a virtual projection view of the rear-cover PCB 360 hidden by a finishing member 425 (FIG. 4C) of the rear cover 320 is marked with a dotted line. The finishing member 425 may be formed of various materials such as a gel, plastic, rubber, metal, ceramic, leather, or fabric. The finishing member 425 functions to maintain the shape of the flip-type cover 100 at least partially, or to protect the portable electronic device 200 against impact or scratches.

The connector 340 and the memory card socket 350 are disposed on an inner surface of the rear cover 320. It is to be noted that the connector 340 and the memory card socket 350 may be disposed at changed positions on the rear cover 320 or may be installed on the connection cover 330 depending on a manufacturer's design. A memory card 455 may be inserted into the memory card socket 350. Alternatively, the rear-cover PCB 360 of the flip-type cover 100 may include a built-in memory card and the memory card socket 350 or the memory card 455 may be covered by the finishing member 425.

A protrusion or a groove may be formed at a specific position on the inner surface of the rear cover 320 or at an edge of the inner surface of the rear cover 320. Because the flip-type cover 100 is configured to substitute for a general battery cover, engagement of the flip-type cover 100 with the portable electronic device 200 effectively renders the portable electronic device 200 more slim.

As illustrated in FIG. 4C, at least a part of the rear-cover PCB 360 may be exposed from the inner surface of the rear cover 320.

Figure 5A:
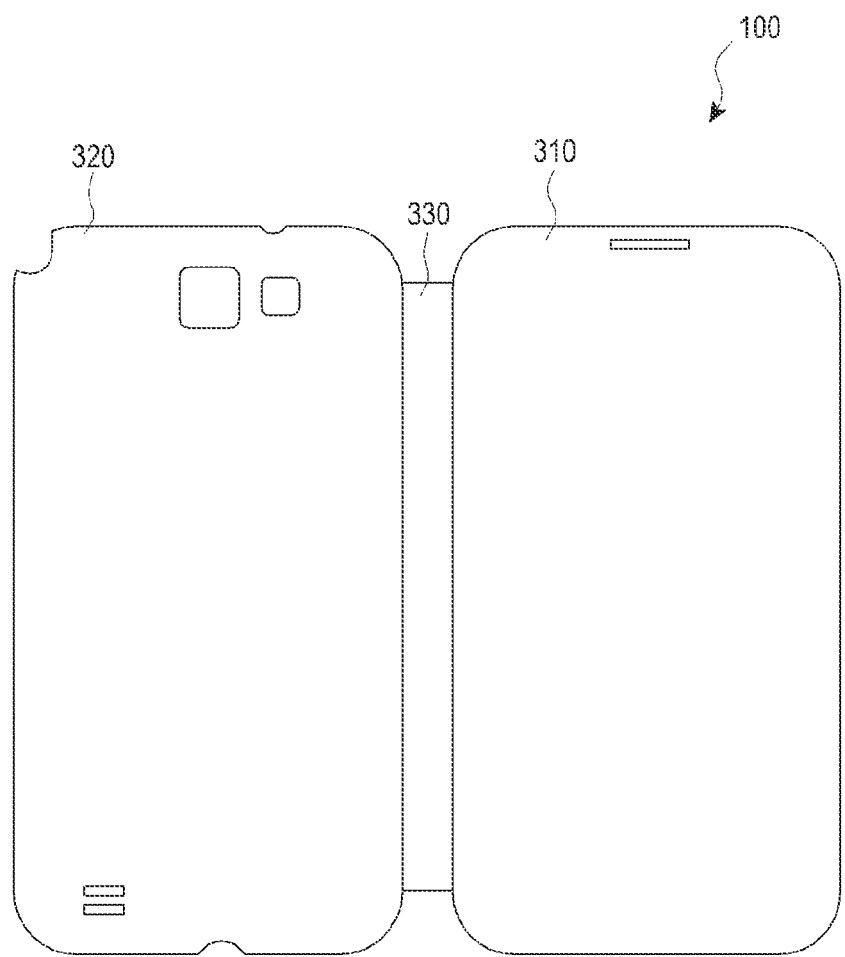
FIG. 5A illustrates the exterior of a flip-type cover according to another embodiment of the present invention.
Figure 5B:
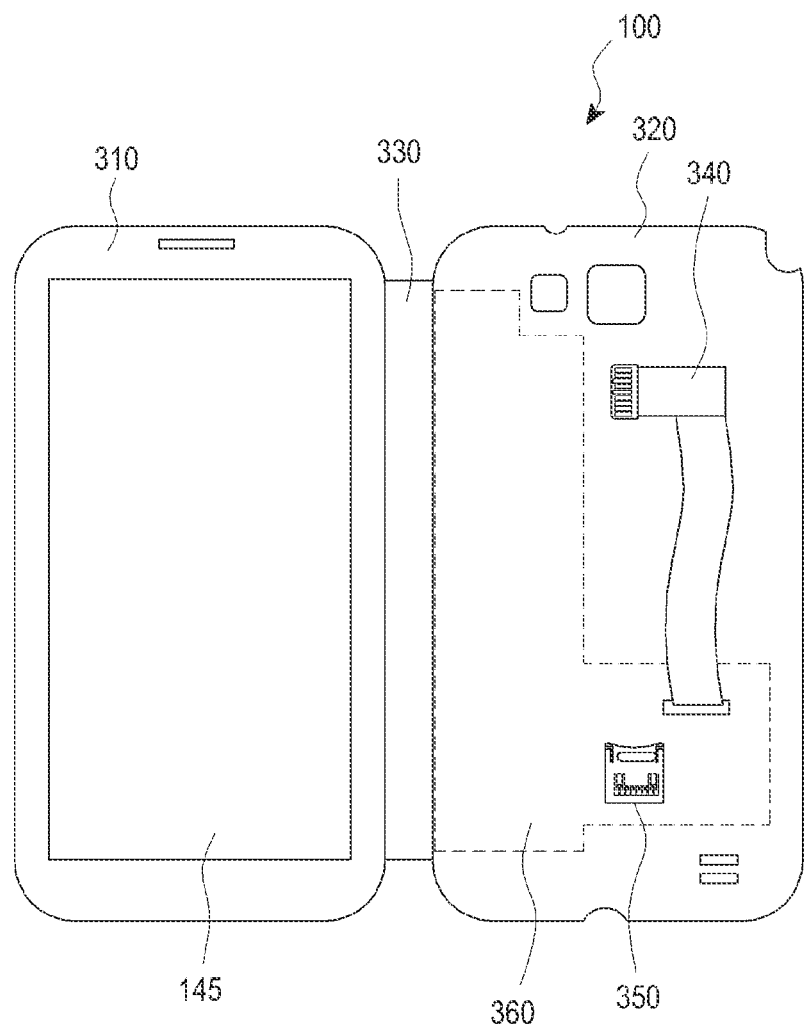
FIG. 5B illustrates the interior of a flip-type cover according to another embodiment of the present invention.

FIG. 5A illustrates the exterior of a flip-type cover and FIG. 5B illustrates the interior of a flip-type cover according to another embodiment of the present invention.

Referring to FIG. 5A, the display screen 145 is not disposed on the outer surface of the front cover 310. Instead, the display screen 145 is positioned on the inner surface of the front cover 310 as illustrated in FIG. 5B. That is, when the rear cover 320 is engaged with the portable electronic device 200 and the front cover 310 covers the host display screen of the portable electronic device 200, the display screen 145 is positioned on a surface of the front cover 310 facing the host display screen. The front surface of the display screen 145 is shown in FIG. 5B as viewed from the direction of the inner surface of the front cover 310.

The display screen 145 may also be disposed on both surfaces (the outer and inner surfaces) of the front cover 310 of the flip-type cover 100. For example, the flip-type cover 100 may be configured to have the exterior illustrated in FIG. 4A and the interior illustrated in FIG. 5B.

The connector 340 and the memory card socket 350 are disposed on the inner surface of the rear cover 320, as shown in FIG. 5B.

Figure 6A:
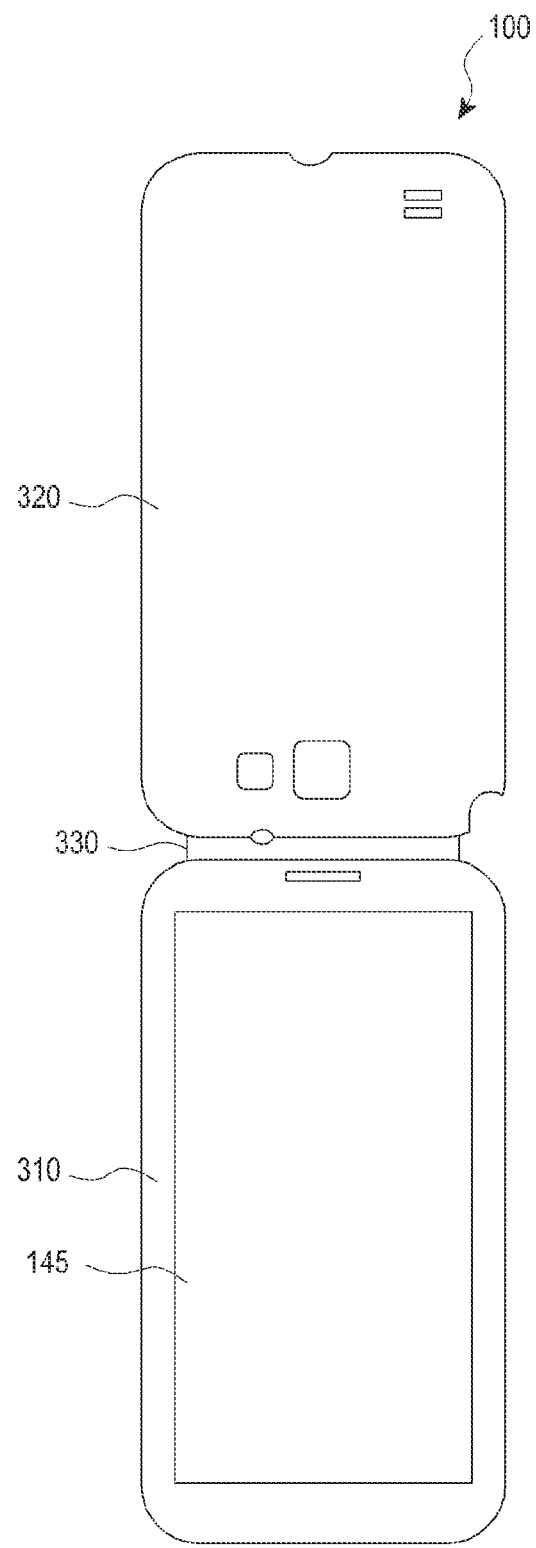
FIG. 6A illustrates the exterior of a flip-type cover according to another embodiment of the present invention.
Figure 6B:
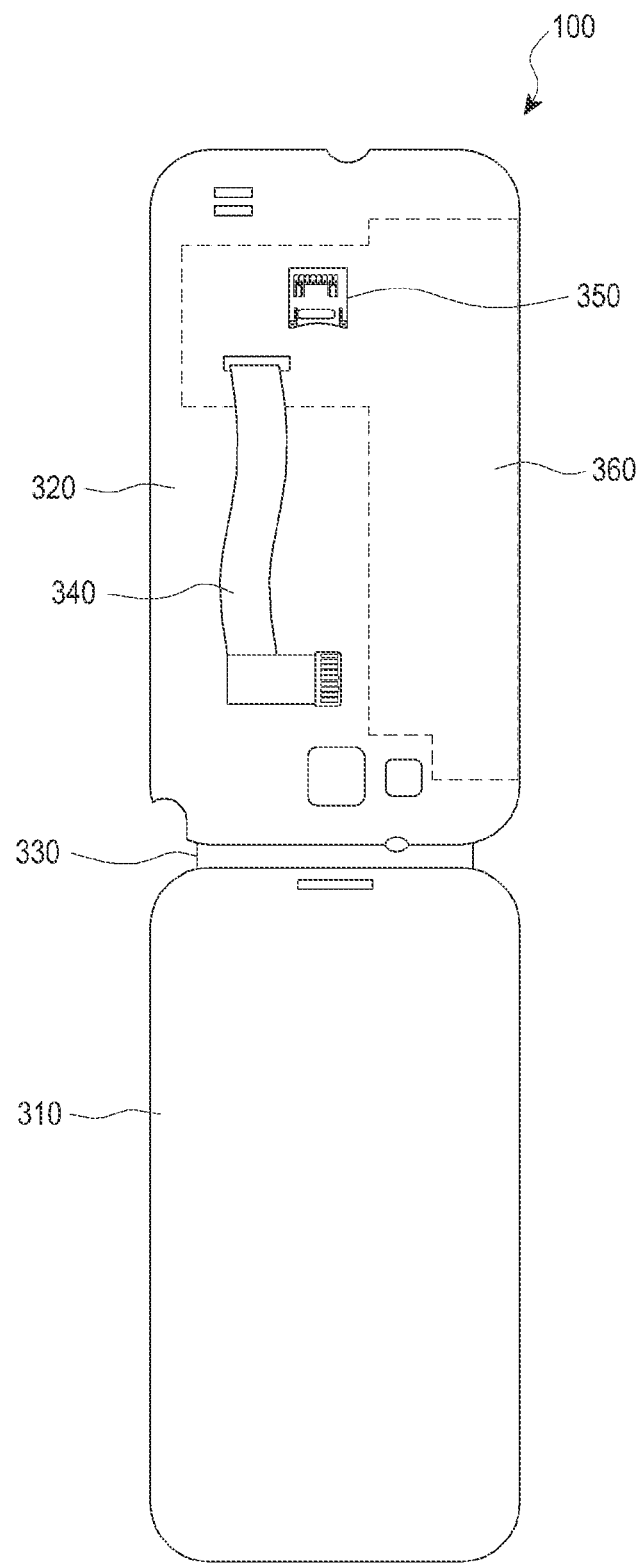
FIG. 6B illustrates the interior of a flip-type cover according to another embodiment of the present invention.

FIG. 6A illustrates the exterior of a flip-type cover and FIG. 6B illustrates the interior of a flip-type cover according to another embodiment of the present invention.

The connection cover 330 connects the front cover 310 to the rear cover 320. Referring to FIGS. 6A and 6B, the connection cover 330 functions as a hinge by connecting a top side of the front cover 310 to a top side of the rear cover 320. Alternatively, the connection cover 330 may connect a bottom side of the front cover 310 to a bottom side of the rear cover 320, or the connection cover 330 may function as a hinge by connecting a left or right side of the front cover 310 to a right or left side of the rear cover 320, as illustrated in FIGS. 4A to 5B.

The display screen 145 is disposed on the outer surface of the front cover 310, or the display screen 145 may be installed on the inner surface or both surfaces of the front cover 310.

Figure 7A:
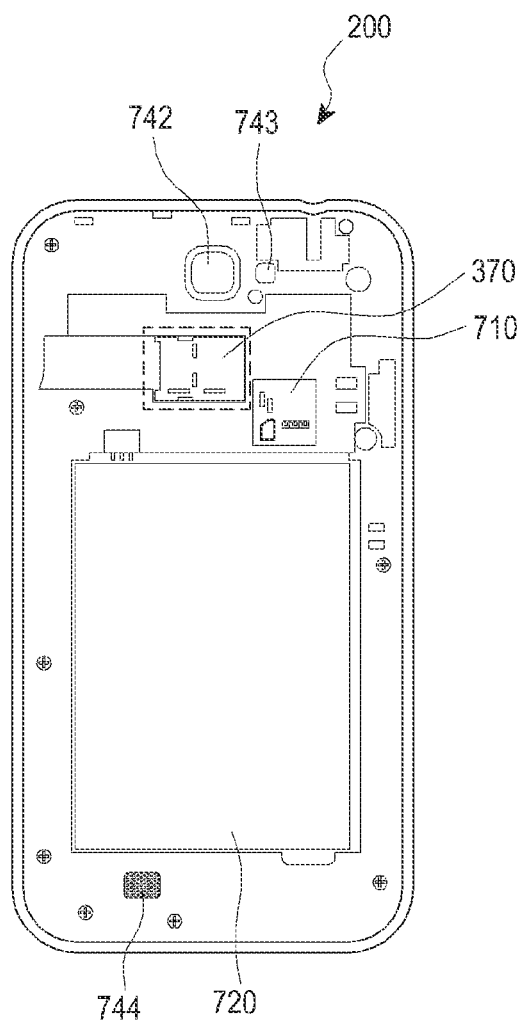
FIGS. 7A, 7B, and 7C illustrate the rear surface of a portable electronic device according to an embodiment of the present invention.
Figure 7B:
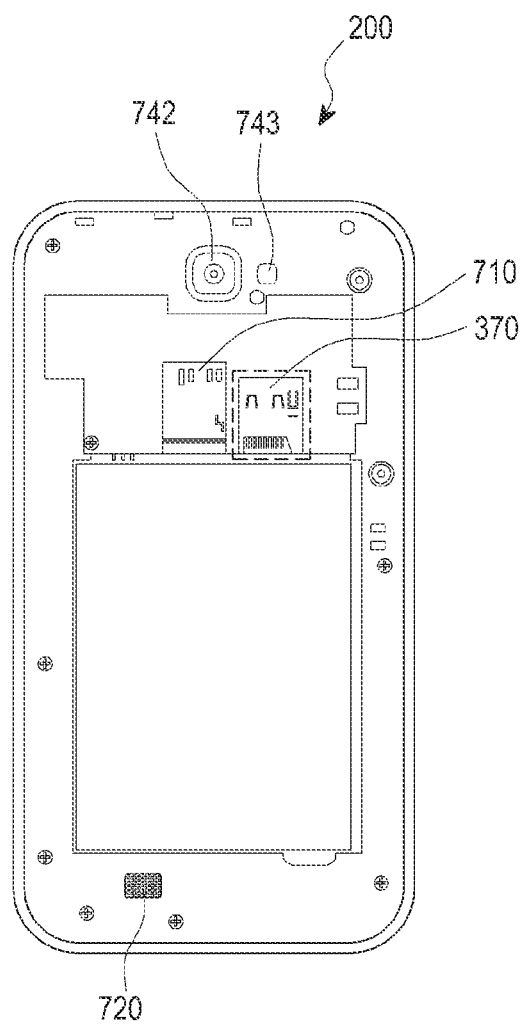
Figure 7C:
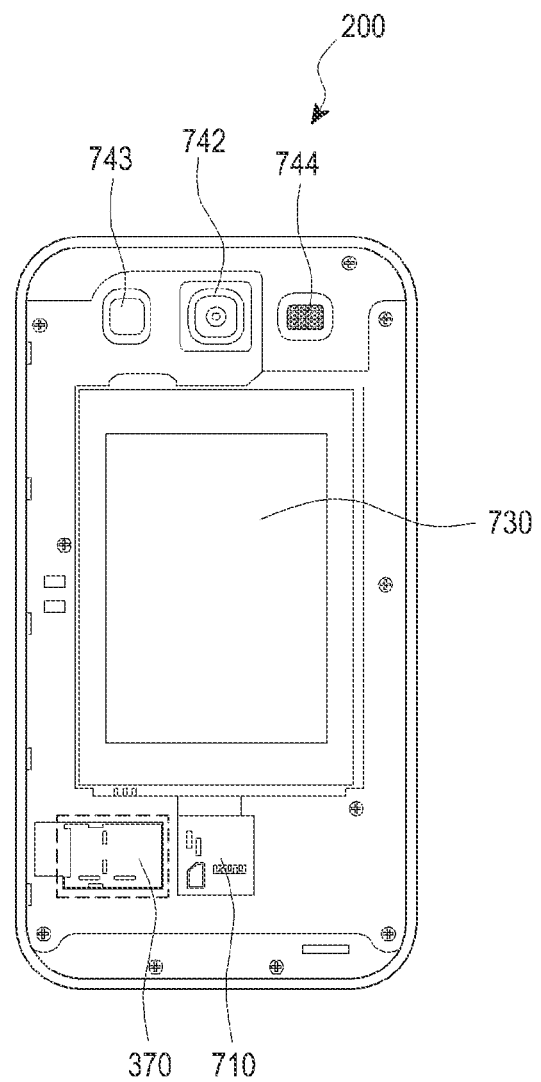

FIGS. 7A, 7B, and 7C illustrate the rear surface of a portable electronic device according to an embodiment of the present invention.

Specifically, FIGS. 7A, 7B, and 7C illustrate the rear surface of the portable electronic device 200 from which the flip-type cover 100 or a battery cover has been removed.

In an embodiment of the present invention, the socket 370 is disposed on the rear surface of the portable electronic device 200, to connect to the connector 340 of the flip-type cover 100. As illustrated in FIGS. 7A, 7B, and 7C, the position or opening direction of the socket 370 connected to the connector 340 may vary depending on the design, model, or specification of the portable electronic device 200.

The positions and sizes of holes formed in the rear cover 320 of the flip-type cover 100 are determined by taking into account the position of a camera 742, a flash 743, or a speaker 744 installed on the rear surface of the portable electronic device 200.

A Universal Subscriber Identity Module (USIM) socket 710 for accommodating a USIM card, a battery 730, a recess 720 for accommodating the battery 730, or a power supply including a power supply interface may be exposed from the rear surface of the portable electronic device 200.

A protrusion or a groove may be formed at a specific position or at an edge of the rear surface of the portable electronic device 200, to be engaged with the battery cover 380 or the flip-type cover 100.

Figure 8:
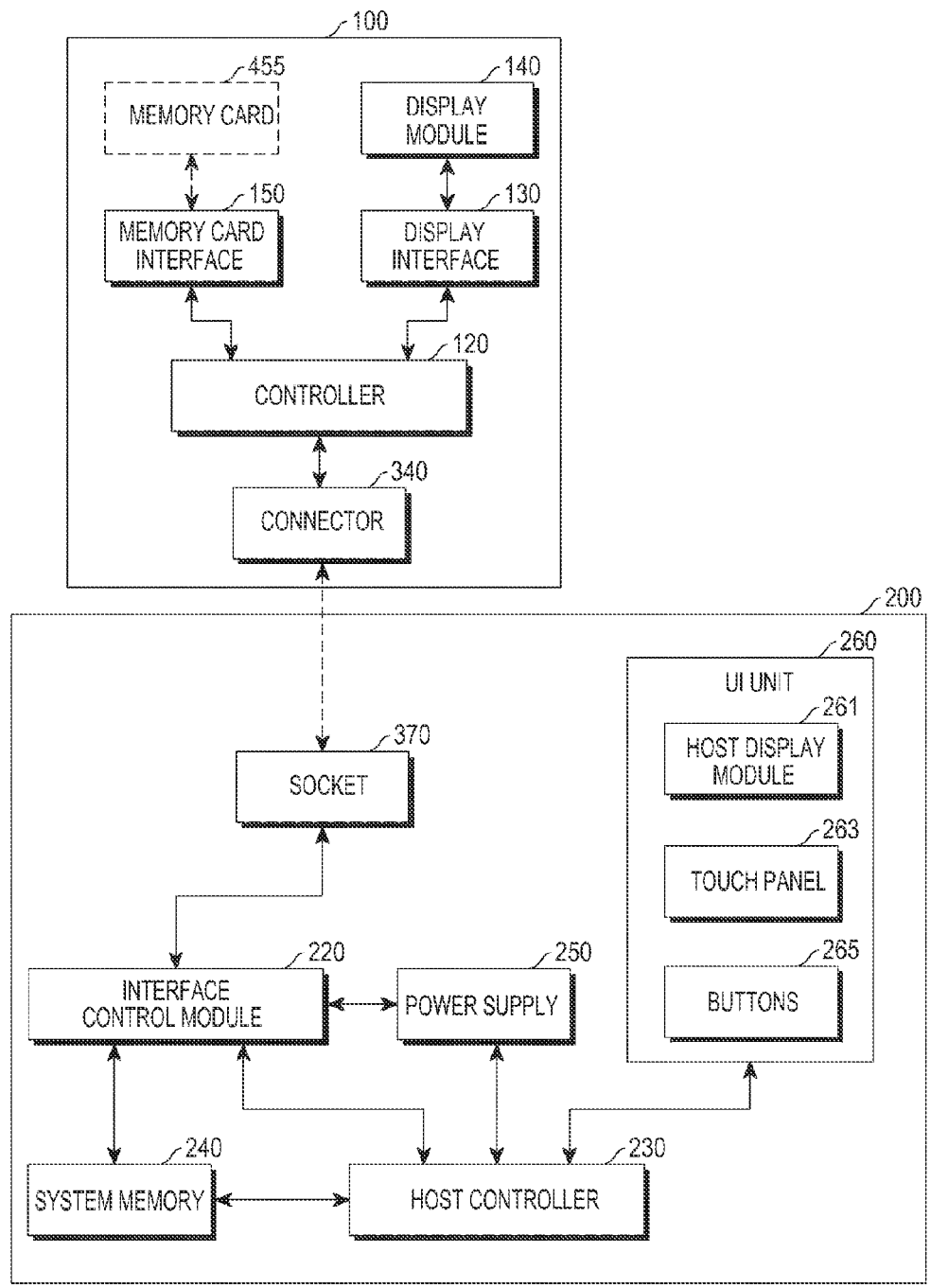
FIG. 8 is a block diagram of a flip-type cover and a portable electronic device according to an embodiment of the present invention.

FIG. 8 is a block diagram of a flip-type cover and a portable electronic device according to an embodiment of the present invention.

Referring to FIG. 8, the flip-type cover 100 includes the connector 340, a display interface 130, and a display module 140. The flip-type cover 100 further includes a controller 120 and a memory card interface 150. The flip-type cover 100 may further include the memory card 455.

The connector 340 corresponds to the socket 370 of the portable electronic device 200. The connector 340 and the socket 370 may be manufacturer-designed interfaces. For example, the socket 370 and the connector 340 may be interfaces that connect 2 to 9 lines designed by a manufacturer, such as a power supply line, a data communication line, and the like. In this case, another socket 370 other than an interface used before the flip-type cover 100 is used may be provided in the portable electronic device 200. In addition, a predetermined socket 370 provided by the manufacturer of the portable electronic device 200 may be used for connection to the connector 340.

The connector 340 and the socket 370 may be fabricated in conformance to a specific standard. For example, the socket 370 conforms to the SDIO standard, for accommodating a memory card. The connector 340 may include a memory card-shaped stub or bridge insertable into a memory card socket. The connector 340 and the socket 370 may be used for an SD card, a micro SD card, a mini SD card, or the like.

The SDIO standard may support 1-bit mode, 4-bit mode, and Serial Peripheral Interface (SPI) mode and may support 8 slots according to an SDIO interface control module. For example, the SDIO connector 340 and the SDIO socket 370 may connect 1 to 4 lines including a data line, a clock line, a command line, a ground, a power supply line, an interrupt line, or the like.

In general, the portable electronic device 200 such as a smartphone is provided with the SDIO socket 370. Thus, the existing socket 370 is used to connect the portable electronic device 200 to the connector 340 without any hardware modification to the portable electronic device 200. As the SDIO socket 370 obviates the need for using an additional socket for supplying power to the flip-type cover 100 and establishing a communication connection between the flip-type cover 100 and the portable electronic device 200, modifications to the hardware design of the portable electronic device 200 is minimized.

The display interface 130 includes a transmission line such as a flexible PCB or a flexible cable to connect the lines connected by the connector 340 to the display module 140. In addition, the display interface 130 includes a transmission line for connecting components of the display module 140 to one another and a multiplexer/demultiplexer.

The display module 140 includes a display screen that displays data or information received from the portable electronic device 200. The display module 140 may include a display panel. The display screen may correspond to a display surface of the display panel included in the display module 140. As described before, the display panel may be configured as a low-power reflective display such as an EPD.

The EPD may be fabricated to be flexible. The EPD has a wide angle of view and is typically cheaper than a Liquid Crystal Display (LCD). In addition, since the EPD consumes low power in changing and maintaining an image displayed on an EPD screen, the EPD may be kept active for a long time so that an image is displayed.

The EPD is used for e-paper, an e-book, and the like. Electrophoresis is a phenomenon that when electrodes are immersed in a colloid solution and a Direct Current (DC) voltage is applied to the electrodes, colloid particles migrate to an electrode at one end. The EPD may be configured without backlights, a polarized plate, or an optical filter. For example, the EPD may be configured as a microcapsule type of E-ink or a microcup type of SiPix.

In a microcapsule-type display, capsules are interposed between an upper transparent electrode and a lower metal electrode. The capsules are filled with a transparent solution and there are a number of white particles charged to positive polarity and black particles charged to negative polarity in the transparent solution. When an electric field is applied to the upper transparent electrode and the lower metal electrode, the white particles and the black particles move to the electrodes having the opposite polarities to their polarities. Thus, an image or text is displayed.

In a microcup-type display, containers contain a solution and monochrome particles. The particles have a single color and are charged only to one of negative and positive polarities. A color image may be displayed by injecting a solution of Red (R), Green (G), or Blue (B) into the containers.

An ElectroFluidic Display (EFD) may be used as a reflective display for the display panel. Since the EFD is excellent in terms of color and contrast characteristics, it is studied as a future-generation display.

The display module 140 may include an LCD, a thin-film transistor LCD, an Organic Light Emitting Diode (LED) display, a flexible display, or a Three-Dimensional (3D) display. The display module 140 may include a display screen mounted on both surfaces of the front cover 310.

The display module 140 may include a Power Management Integrated Circuit (PMIC), a Complex Programmable Logic Device (CPLD), a display controller, or the like.

The PMIC converts an input current or voltage to an operation current or voltage for the display panel and may divide power suitably for an interface used in the display module.

The CPLD is a logic circuit programmed to provide data and a control signal received from the display interface 130 to the display controller and the display panel, adaptively according to the display module 140 and to execute a corresponding function.

The display controller converts data received from the portable electronic device 200 to a form suitable for the characteristics of the display module or may control operations of the display panel.

The controller 120 switches data received from the portable electronic device 200 to at least one of the display module and the memory card 455. For the switching function, the controller 120 includes a register (or a memory), a buffer, or a processor. The controller 120 may further include a multiplexer or demultiplexer for connection and selection between a plurality of cards (or modules). The switching function of the controller 120 may include a routing function or a hub function.

Referring to FIG. 8, the portable electronic device 200 includes the socket 370, an interface control module 220, a power supply 250, and a host controller 230. The portable electronic device 200 further includes a system memory 240 and a UI unit 260.

The socket 370 may be a dedicated socket designed to accommodate the connector 340 of the flip-type cover 100 by a manufacturer or may be an SDIO socket as described before.

The interface control module 220 controls transmission and reception of data or a control signal in correspondence with socket pins of the socket 370 or connection lines. The interface control module 220 may provide a clock signal matching the design or specification of the socket 370 or may provide a synchronization function with a card (or module) connected to the socket 370. For example, the interface control module 220 may include an SDIO host controller.

The power supply 250 supplies power to components of the portable electronic device 200 and the flip-type cover 100 under the control of the host controller 230. In addition, the power supply 250 may supply power received from an external power source (not shown) via a cable to the portable electronic device 200 or the battery 730. The power supply 250 may control supply of power received wirelessly from an external power source by a wireless charging technology to the portable electronic device 200 or may charge the battery 730 with the power.

The host controller 230 controls initialization of a communication connection with a card/cards (or module/modules) connected to the interface control module 220 through the interface control module 220. The host controller 230 controls display of data or information on the display screen 145 of the display module 140 in the flip-type cover 200.

The host controller 230 may include a Central Processing Unit (CPU), a Read Only Memory (ROM) that stores a control program for controlling the portable electronic device 200, or a Random Access Memory (RAM) that stores a signal or data received from the outside of the portable electronic device 200 or that is used as a memory space for an operation performed in the portable electronic device 200. The CPU may include one or more cores. The CPU, the ROM, and the RAM may be interconnected via an internal bus or may be implemented as a chip or a module. The system memory 240 stores an application that performs a display function on the display screen 145 of the flip-type cover 100 or controls a user manipulation of data or information displayed on the display screen 145. The system memory 240 stores a host driver for providing overall control to the components of the portable electronic device 200, corresponding to the interface control module 220. The system memory 240 may store a card driver for a card/cards (module/modules) connected to the interface control module 220.

The system memory 240 may store applications having various functions such as communication service, navigation, gaming, and the like, images needed to provide Graphical User Interfaces (GUIs) related to the applications, user information, text, databases or data related to touch input processing, background images (a menu screen, an idle screen, and the like) needed to operate the portable electronic device 200, or operation programs.

The system memory 240 may include a machine-readable medium (for example, a computer-readable medium). The system memory 240 may access information of the machine-readable medium and store the accessed information under the control of the host controller 230. The machine-readable medium may be a medium that provides data to a machine so that the machine may perform a specific function. For example, the machine-readable medium may be a storage medium. The machine-readable medium may include, but not limited to, at least one of a floppy disk, a flexible disk, a hard disk, a magnetic tape, a Compact Disc ROM (CD-ROM), an optical disk, a punch card, a paper tape, a RAM, a Programmable ROM (PROM), an Erasable PROM (EPROM), and a Flash EPROM.

At least a part of data or information of the system memory 240 may be stored in the memory card 455 accommodated or included in the flip-type cover 100.

The UI unit 260 may include a host display module 261, a touch panel 263, buttons 265, or the like.

The host display module 261 may include a host display panel and a data-displaying surface of the host display panel may be configured as a host display screen. The portable electronic device 200 may not be provided with the host display module 261. In this case, the display module 140 of the flip-type cover 100 may perform the display function of the portable electronic device 200.

The host display module 261 may include an LCD, a thin-film LCD, an OLED display, a flexible display, a 3D display, an EPD, an EFD, or the like.

The touch panel 263 may be configured as a resistive type, a capacitive type, an ElectroMagnetic (RM) type, Electro-Magnetic Resonance (EMR) type, an infrared type, an acoustic type, or the like.

The host display module 261 and the touch panel 263 may be integrated into a touch screen. Then, the UI unit 260 may further include a touch screen controller.

The touch screen receives at least one touch from a user's body (for example, a finger) or a touch input unit. The touch screen may include a pen recognition panel that recognizes an input from a pen such as a stylus pen or an electronic pen. The touch screen may be fabricated by stacking a panel that senses an input from a finger or an input unit based on a variation in induced power, a display panel, and a panel that senses a touch of a finger or an input unit based on a resistance variation or a capacitance variation, close to each other or some of the panels apart from each other. The touch screen controller converts an analog signal received from the touch screen to a digital signal (for example, X and Y coordinates) and transmits the digital signal to the host controller 230. The host controller 230 may control the touch screen using the received digital signal. The touch screen controller may be incorporated into the host controller 230.

The host controller 230 may receive a hovering touch signal sensed from the touch panel 263 or the touch screen and may recognize, for example, a touch gesture on the display screen 145 of the flip-type cover 100 illustrated in FIGS. 1A, 1B, and 1C. Even though the flip-type cover 100 is not equipped with a touch panel, the portable electronic device 200 may recognize a touch gesture using the touch panel 263. Consequently, the fabrication cost of the flip-type cover 100 may be reduced and a user-friendly UI may be provided using the flip-type cover 100.

The buttons 265 may receive a button input (or a key input) from a user to control the portable electronic device 200. The buttons 265 include a physical button (or key) formed in the portable electronic device 200, and a virtual button or a virtual keypad displayed on the touch screen. A physical keypad may not be provided in the portable electronic device 200 according to a manufacturer's design. Referring to FIG. 1C, a user manipulation of a button 265 may serve as a control command for content displayed on the display screen 145 of the flip-type cover 100. For example, with the host display module 261 deactivated, page turning may be performed with respect to content displayed on the display screen 145, using a volume up/down button.

The UI unit 260 may further include a vibration motor for providing a haptic effect to a user and a connector or connector jack for connection to an external I/O device.

The portable electronic device 200 may further include a sensor unit (not shown). The sensor unit may include a motion sensor such as a tilting sensor, an acceleration sensor, a gyro sensor, or the like. The host controller 230 may recognize a motion gesture representing a user manipulation of the portable electronic device 200 based on sensing data received from the motion sensor. A motion gesture may be used for user interaction regarding data or information displayed on the display screen 145 of the flip-type cover 100. For example, referring to FIG. 1C, a panning gesture on the portable electronic device 200 may be recognized as a control command for paging turning or content switching with respect to content displayed on the display screen 145 of the flip-type cover 100.

The sensor unit may further include a proximity sensor or a camera module in order to sense opening or closing of the front cover 310. The camera module may capture surroundings or a user of the portable electronic device 200 or the proximity sensor may detect proximity of an object to the portable electronic device 200.

To determine whether the front cover 310 is close to the portable electronic device 200, a magnet and a magnetic sensor may be used. For example, a magnet may be mounted to the front cover 310 and a magnetic sensor may be included in correspondence with the position of the magnet of the front cover 310 in the portable electronic device 200.

Figure 9:
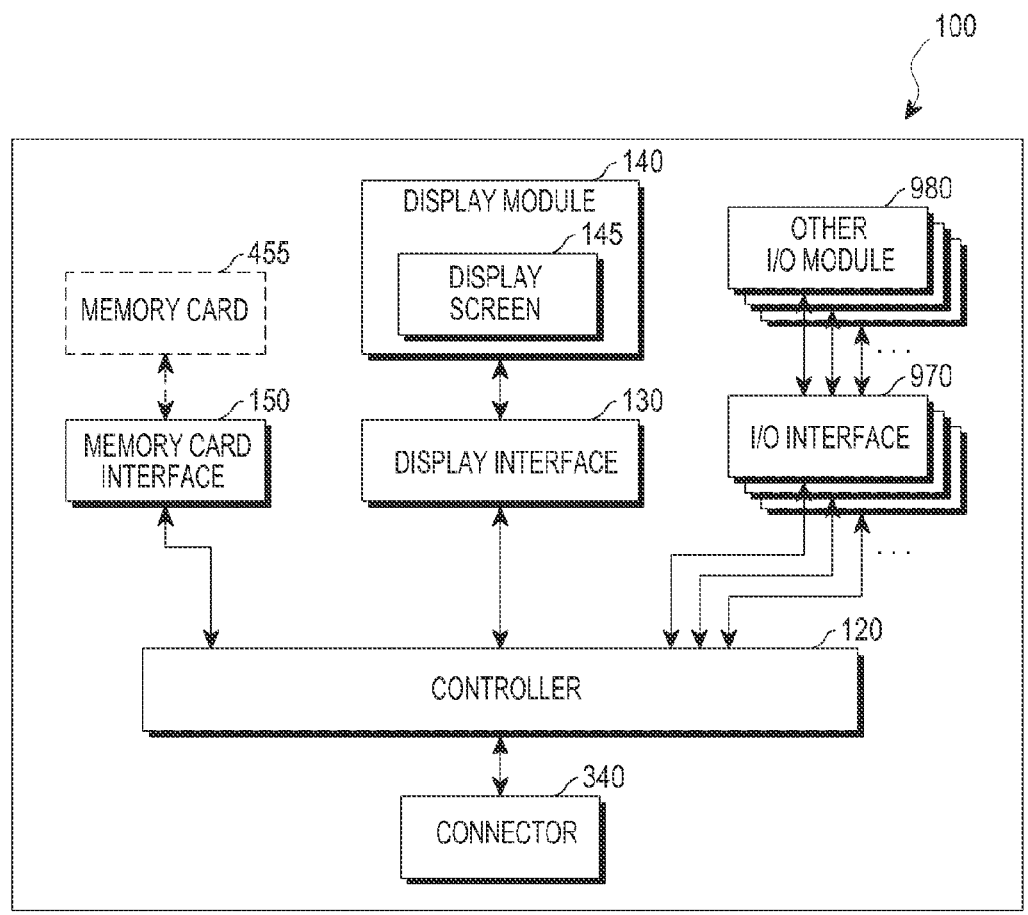
FIG. 9 is a block diagram of a flip-type cover according to another embodiment of the present invention.

The sensor unit may include a luminance sensor for detecting the intensity of ambient light, a geo-magnetic sensor for detecting a point of the compass based on Earth's magnetic field, a gravity sensor for detecting a direction in which gravity is exercised, an altimeter for detecting an altitude by measuring an air pressure, and the like. The sensor unit may further include a GPS module for receiving satellite signals from GPS satellites in Earth orbit and calculating the position of the portable electronic device 200 based on Time of Arrivals (ToAs) of the satellite signals. FIG. 9 illustrates a flip-type cover according to another embodiment of the present invention.

Referring to FIG. 9, the flip-type cover 100 according to another embodiment of the present invention includes the memory card 455 and at least one I/O module 980 in addition to the display module 140. The flip-type cover 100 further includes at least one I/O interface 970 corresponding to the at least one I/O module 980.

The flip-type cover 100 may be configured to include the at least one I/O module 980 according to its usage. The flip-type cover 100 may further include a slot (or socket) into which the at least one I/O module 980 is detachably inserted.

The controller 120 of the flip-type cover 100 controls switching of data received from the portable electronic device 200 to one of the display module 140, the memory card 455, and the at least one I/O module 980.

Figure 10:
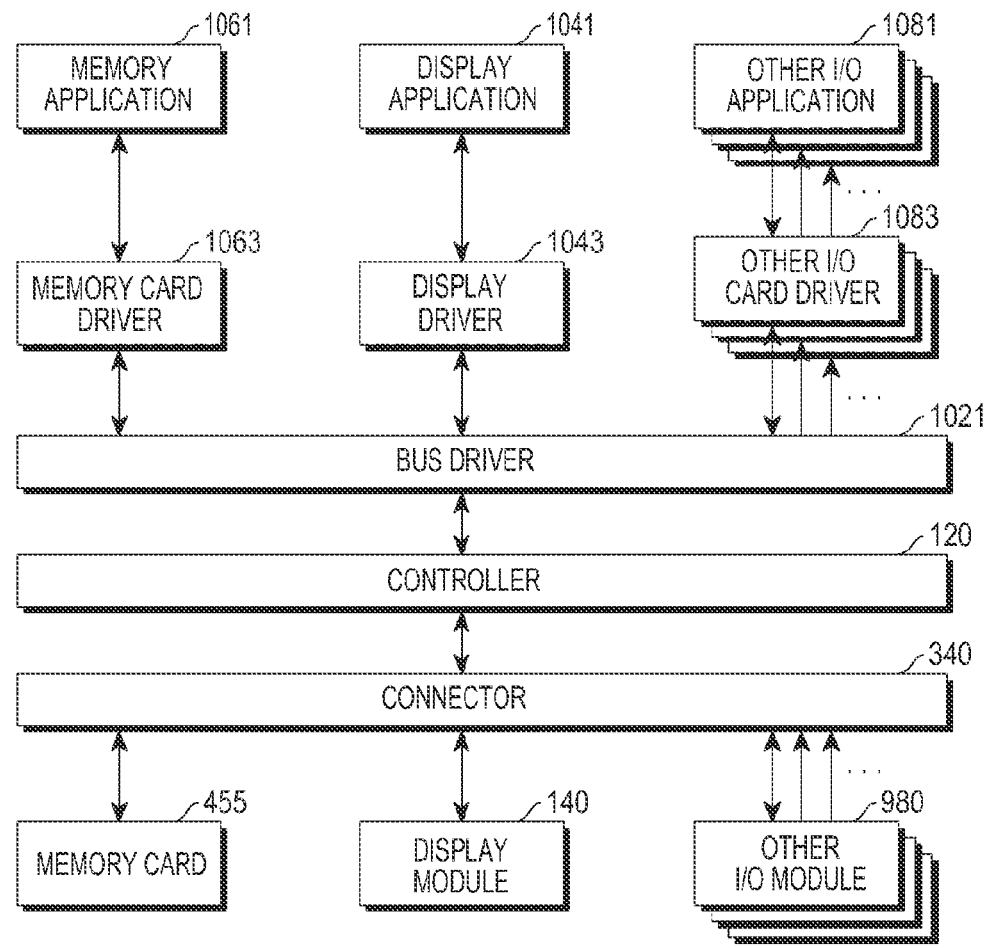
FIG. 10 is a block diagram illustrating hierarchical functions of a flip-type cover and a portable electronic device according to an embodiment of the present invention.

FIG. 10 is a block diagram illustrating hierarchical functions of a flip-type cover and a portable electronic device according to an embodiment of the present invention.

Referring to FIG. 10, when the flip-type cover 100 and the portable electronic device 200 are electrically connected through the connector 340 and the socket 370, a bus driver (or host driver) 1021 of the portable electronic device 200 recognizes the presence of a card/cards (or module/modules) mounted to the flip-type cover 100 (the display module 140, the memory card 455, or the at least one I/O module 980) in the interface control module 220 of the portable electronic device 200. The interface control module 220 transmits a sensed event to the host controller 230 to initialize an installed module.

The host controller 230 controls initialization of a communication connection to each of the sensed card/cards (or module/modules) mounted to the flip-type cover 100 (the display module 140, the memory card 455, or the at least one I/O module).

The host controller 230 controls transmission of slot selection information corresponding to a specific card to the controller 120 of the flip-type cover 100 through the interface control module 220. The controller 120 initializes the card corresponding to the slot or identify the mode of the slot. The controller 120 may access a register map of the card connected to the slot and then transmit information about the card to the portable electronic device 200.

The bus driver (or host driver) 1021 invokes a driver of the card based on the information about the card.

The system memory 240 of the portable electronic device 200 stores a card driver (a display driver 1043, a memory card driver 1063, or at least one I/O card driver 1083) and an application (a display application 1041, a memory application 1061, or at least one I/O application 1081) corresponding to each card (the display module 140, the memory card 455, or the at least one I/O module 980). In addition, the host controller 230 accesses a card driver or an application in the system memory 240.

Figure 11:
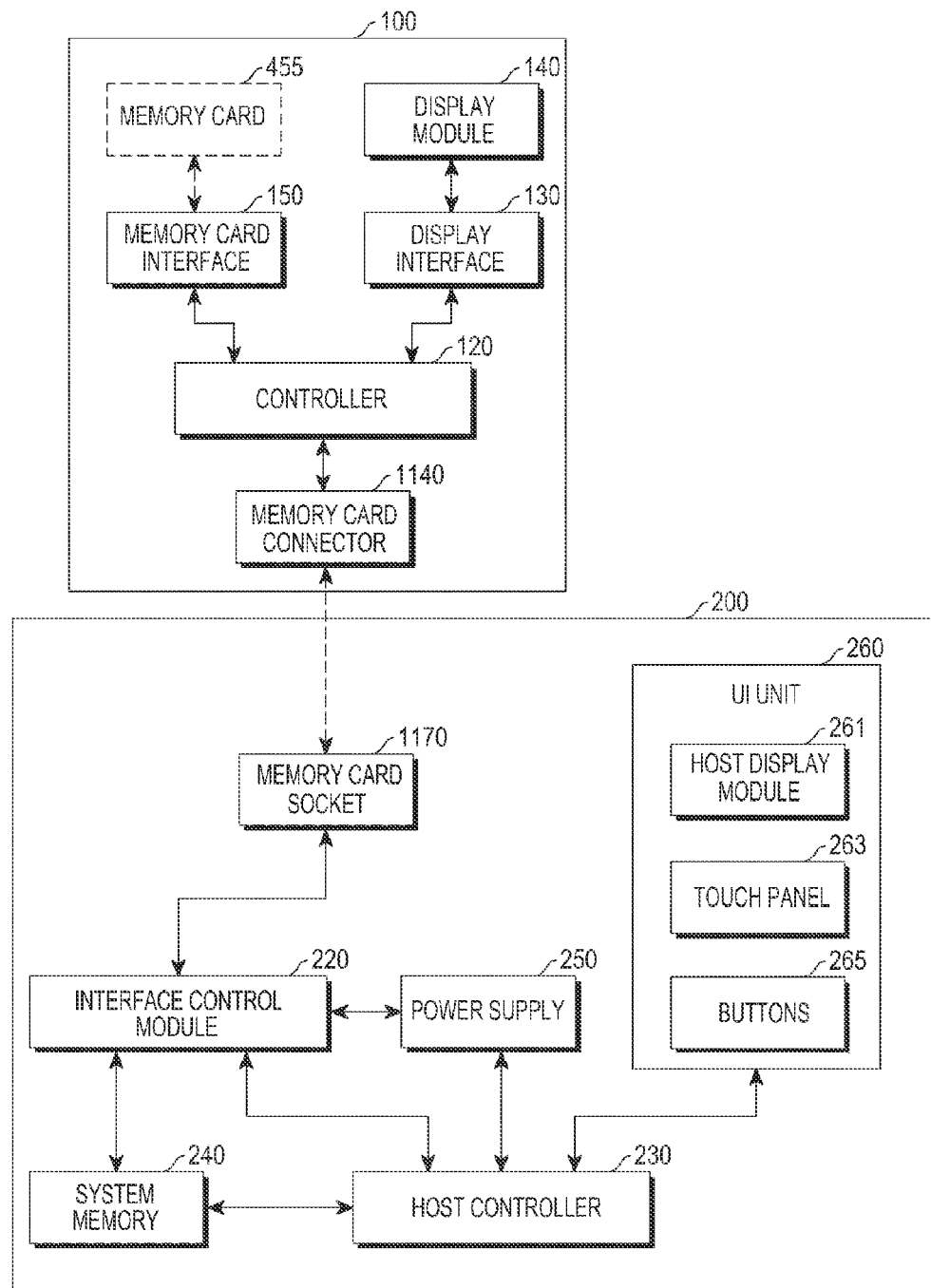
FIG. 11 is a block diagram of a flip-type cover and a portable electronic device according to another embodiment of the present invention.

FIG. 11 is a block diagram of a flip-type cover and a portable electronic device according to another embodiment of the present invention. The same components as or similar components to those described before with reference to FIG. 8 will not be described herein.

Referring to FIG. 11, the flip-type cover 100 includes a memory card connector 1140, the display interface 130, and the display module 140. The flip-type cover 100 further includes the controller 120 and the memory card interface 150, as well as the memory card 455.

The memory card connector 1140 is an SDIO interface and may include a card-shaped stub or bridge insertable into a memory card socket.

Referring to FIG. 11, the portable electronic device 200 includes a memory card socket 1170, the interface control module 220, the power supply 250, and the host controller 230. The portable electronic device 200 further includes the system memory 240 and the UI unit 260.

The memory card socket 1170 is an SDIO interface for accommodating a memory card. The memory card socket 1170 and the memory card connector 1140 may be used for an SD card, a micro SD card, or a mini SD card.

Figure 12:
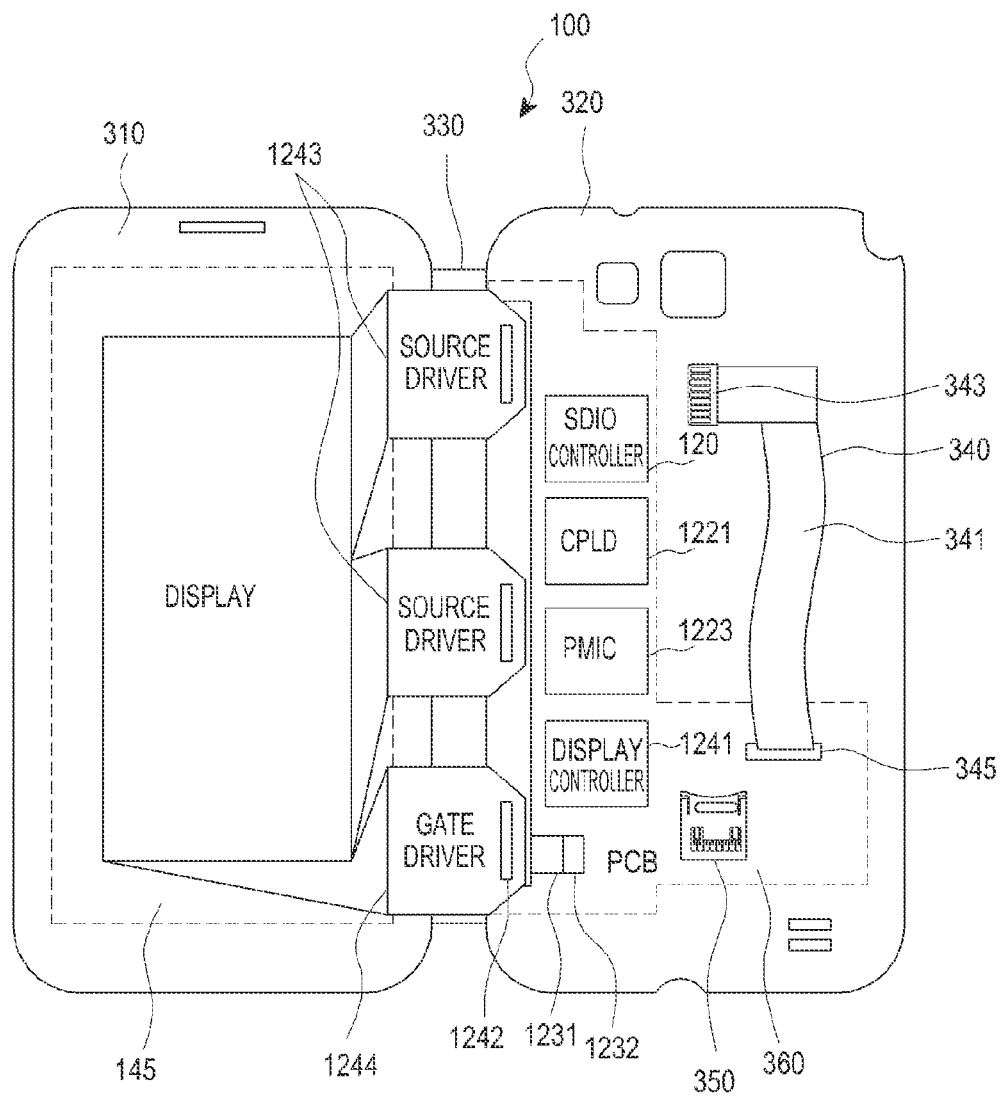
FIG. 12 conceptually illustrates components of a flip-type cover according to an embodiment of the present invention.

FIG. 12 conceptually illustrates components of a flip-type cover according to an embodiment of the present invention. Components of the flip-type cover will be described in greater detail with reference to FIGS. 8 and 12.

The rear-cover PCB 360 includes the controller 120. If the socket 370 of the portable electronic device 200 and the connector 340 of the flip-type cover 100 conform to the SDIO standard, the controller 120 may be referred to as an SDIO controller that controls an SDIO card.

The display interface 130 includes a demultiplexer or multiplexer 1242, a cable or flexible PCB 1231, a display connector 1232, and the like, for connecting the display panel of the display module 140 to lines of the rear-cover PCB 360.

The display module 140 includes a source driver 1243 and a gate driver 1244, which transmit an operation signal or data to the display panel so that the display panel performs a display operation.

The display module 140 includes a PMIC 1223, a CPLD 1221, and a display controller 1241. The PMIC 1223 converts an input current or voltage to a current or voltage required to operate the display panel or supplies power to the display panel.

The CPLD 1221 is a logic circuit programmed to transmit data and a control signal received from the display interface 130 to components of the display module 140 or to perform a display function.

The display controller 1241 converts data received from the portable electronic device 200 adaptively according to the characteristics of the display module 140 or may control operations of the display panel.

Figure 13:
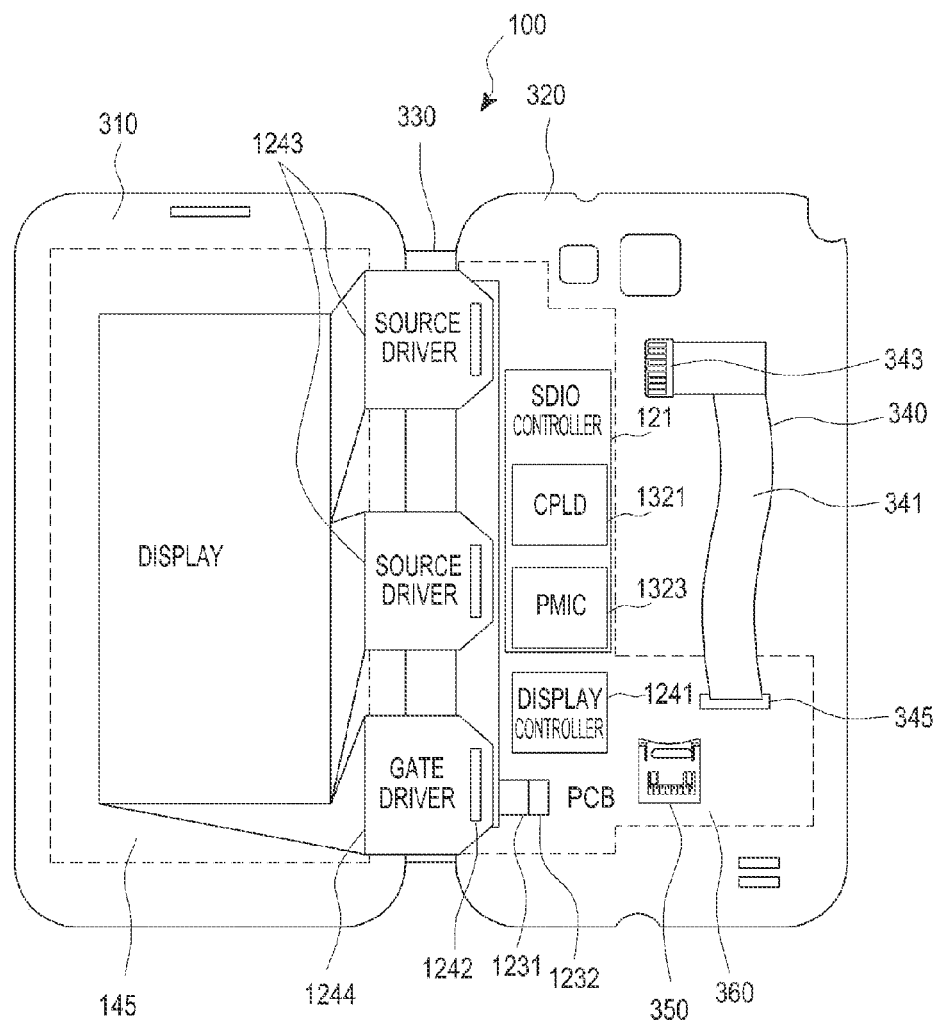
FIG. 13 conceptually illustrates components of a flip-type cover according to another embodiment of the present invention.

FIG. 13 conceptually illustrates components of a flip-type cover according to another embodiment of the present invention.

As illustrated in FIG. 13, the rear-cover PCB 360 includes at least a part of the display module 140, such as the PMIC 1223, the CPLD 1221, or the display controller 1241.

A controller (or SDIO controller) 121 of the flip-type cover 100 may include a PMIC 1321 or a CPLD 1323.

The PMIC 1321 converts or supplies power to a memory card inserted into the memory card socket 350 or an I/O module as well as the display module 140.

The CPLD 1323 is a logic circuit programmed to execute a function and an operation of the display module 140, a memory card, or an I/O module.

Figure 14A:
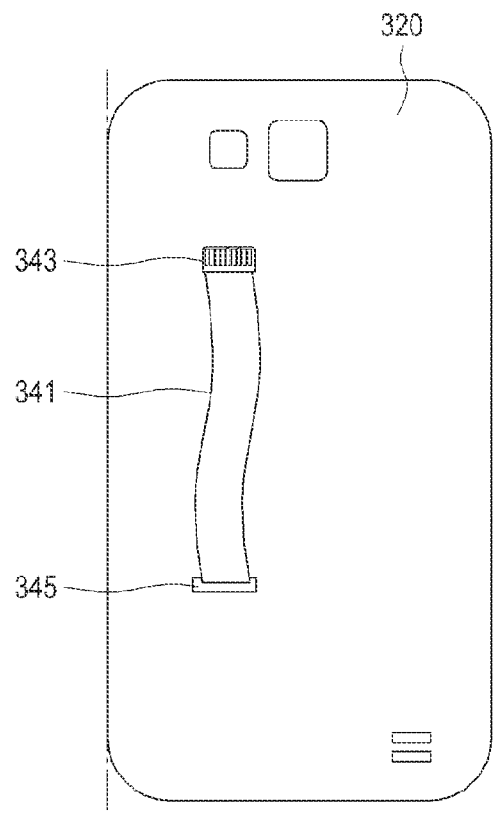
FIGS. 14A and 14B illustrate a connector of a flip-type cover according to an embodiment of the present invention.
Figure 14B:
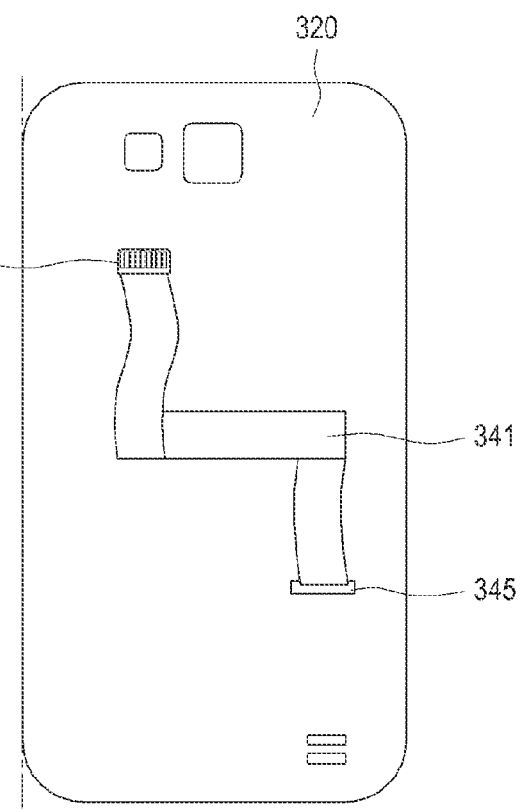

FIGS. 14A and 14B illustrate a connector of a flip-type cover according to an embodiment of the present invention.

As illustrated in FIG. 3A, the connector 340 of the flip-type cover 100 includes the stub 343 insertable into the socket 370 and the flexible PCB (or flexible cable) 341 that connects the rear-cover PCB 360 to the stub 343. The connector 340 further includes the connector connection member 345 for connecting the rear-cover PCB 360 to the flexible PCB 341.

The position or direction of the stub 343 of the connector 340 may correspond to the position or opening direction of the socket 370 mounted to the rear surface of the portable electronic device 200. For example, the connector 343 illustrated in FIGS. 14A and 14B corresponds to the socket 370 of the portable electronic device 200 illustrated in FIG. 7B.

The connector connection member 345 of the connector 340 in the flip-type cover 100 may be fixed at a specific position according to a design of a manufacturer, as illustrated in FIGS. 4B and 14B. In this case, even though the position or opening direction of the socket 370 in the portable electronic device 200 is different, the standardized rear-cover PCB 360 may be used.

As illustrated in FIG. 14A, the connector connection member 345 may be formed at a position optimized for the position or opening direction of the socket 370 of the portable electronic device 200.

Now a description will be given of various connectors and sockets that enable engagement of the flip-type cover with the portable electronic device with reference to FIGS. 15A to 18C.

Figure 15A:
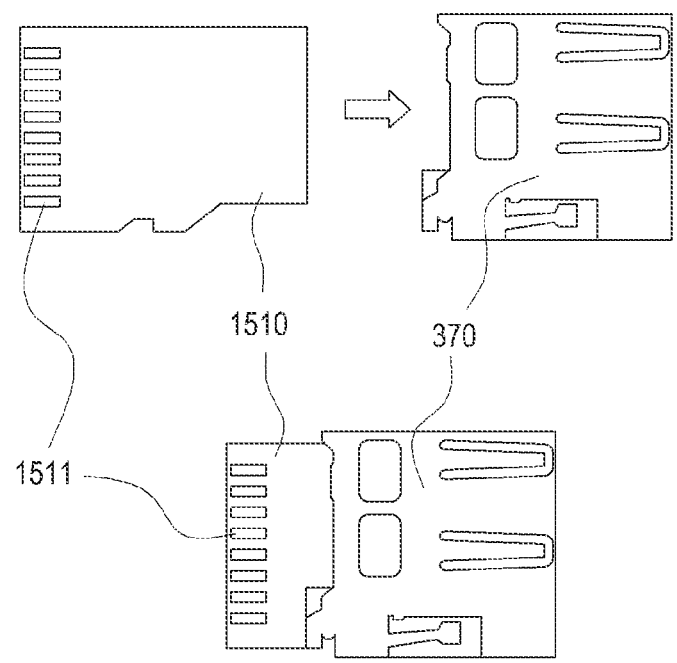
FIGS. 15A, 15B, and 15C illustrate a connector of a flip-type cover and engagement of the connector with a portable electronic device according to another embodiment of the present invention.
Figure 15B:
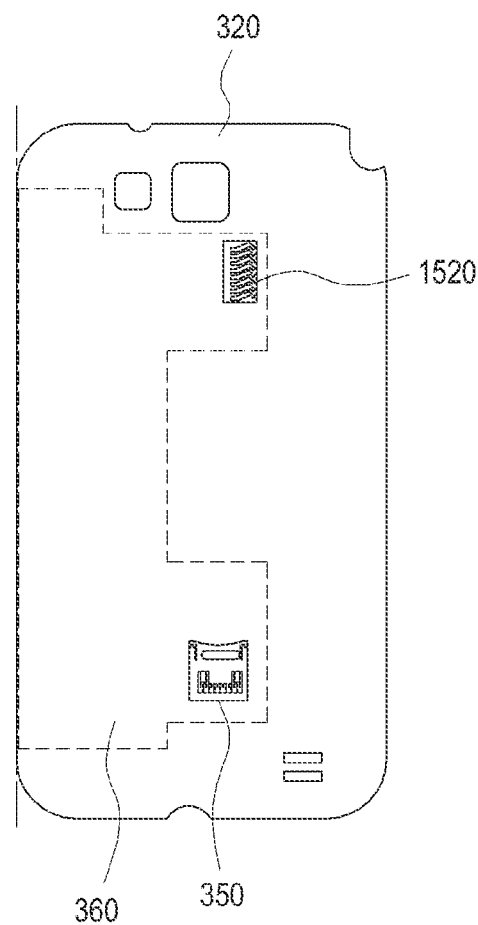
Figure 15C:
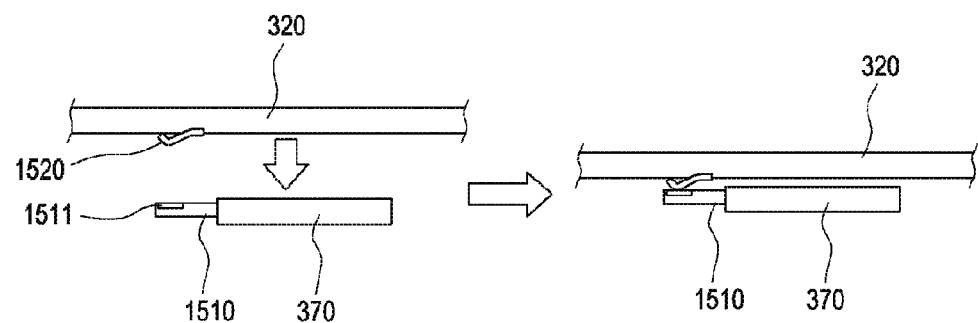

FIGS. 15A, 15B, and 15C illustrate a connector of a flip-type cover and engagement of the connector with a portable electronic device according to another embodiment of the present invention.

The flip-type cover 100 includes the connector 340 that connects the rear-cover PCB 360 to the portable electronic device 200.

The connector 340 corresponds to the socket 370 mounted to the rear surface of the portable electronic device 200. For example, the socket 370 may be a memory card socket such as a micro SD card socket. Hereinbelow, the socket 370 is described as a memory card socket.

The connector 340 includes a bridge 1510 shaped into a memory card so that the bridge 1510 may be inserted into the memory card socket 370, and a plurality of connection pins 1520 installed in the rear-cover PCB 360. If the bridge 1510 is shaped into a memory card, this means that the bridge 1510 can be inserted into the memory card socket 370 and includes a plurality of pins corresponding to a plurality of socket pins of the memory card socket 370.

The bridge 1510 includes a plurality of bridge pins 1511 which, when the bridge 1510 is inserted into the memory card socket 370, are brought into contact with the plurality of connection pins 1520, as shown in FIGS. 15B and 15C.

For example, the plurality of connection pins 1520 may be bent, to protrude from one surface of the rear-cover PCB 360. When the bridge 1510 is inserted into the memory card socket 370, the plurality of bridge pins 1511 are exposed on one surface of the bridge 1510.

Figure 16A:
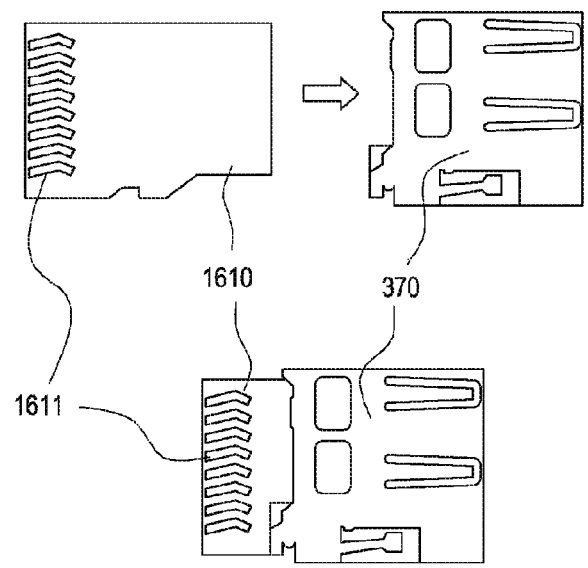
FIGS. 16A, 16B, and 16C illustrate a connector of a flip-type cover and engagement of the connector with a portable electronic device according to another embodiment of the present invention.
Figure 16B:
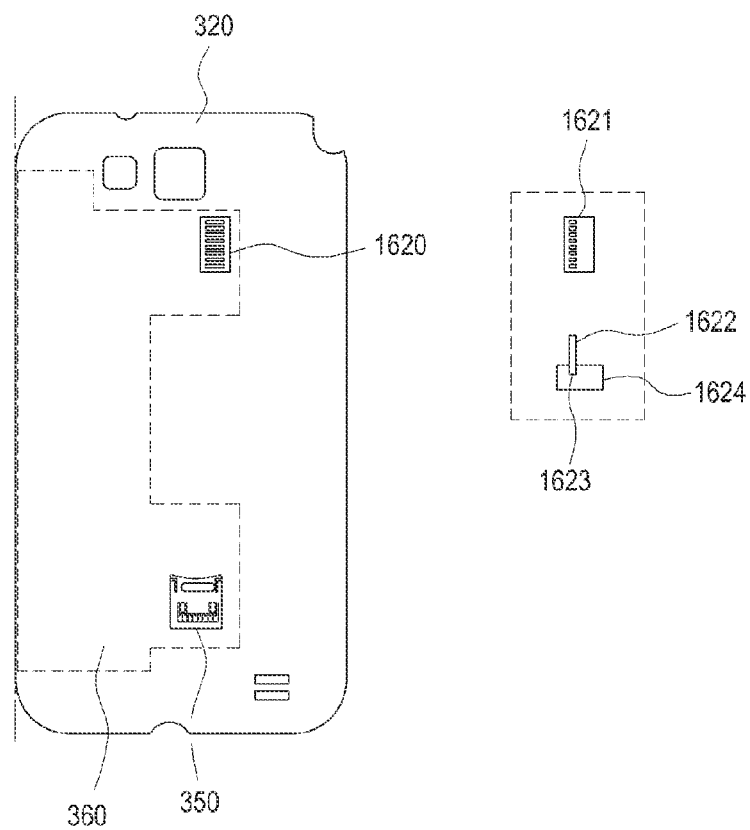
Figure 16C:
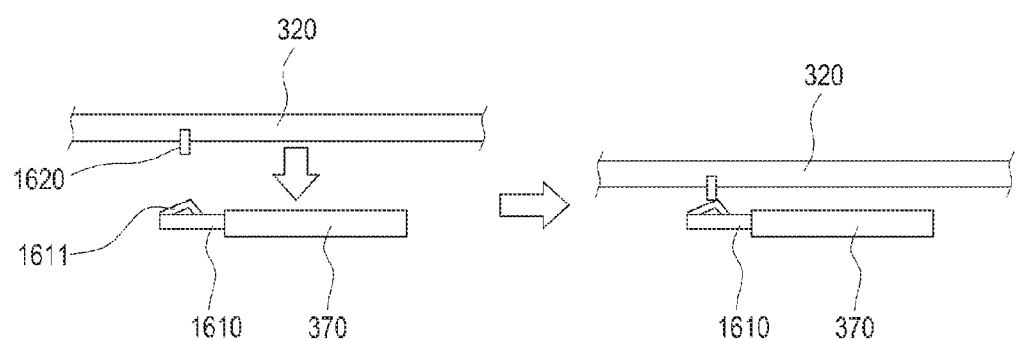

FIGS. 16A, 16B, and 16C illustrate a connector of a flip-type cover and engagement of the connector with a portable electronic device according to another embodiment of the present invention.

The flip-type cover 100 includes the connector 340 that connects the rear-cover PCB 360 to the portable electronic device 200.

The connector 340 corresponds to the socket 370 mounted to the rear surface of the portable electronic device 200. For example, the socket 370 may be a memory card socket such as a micro SD card socket. Hereinbelow, the socket 370 is described as a memory card socket.

The connector 340 includes a bridge 1610 shaped into a memory card so that the bridge 1610 may be inserted into the memory card socket 370, and a plurality of connection pins 1620 installed in the rear-cover PCB 360.

The bridge 1610 includes a plurality of bridge pins 1611 which, when the bridge 1610 is inserted into the memory card socket 370, are brought into contact with the plurality of connection pins 1620, as shown in FIGS. 16B and 16C.

For example, the plurality of connection pins 1620 may exposed from one surface of the rear-cover PCB 360. When the bridge 1610 is inserted into the memory card socket 370, the plurality of bridge pins 1611 may be bent, to protrude from one surface of the bridge 1610.

The plurality of connection pins 1621 may substitute for the plurality of connection pins 1620. One pin 1622 of the connection pins 1621 will be described. The connection pin 1622 may be mounted to a conductor 1624 included in the rear-cover PCB 360 or may be integrated into the conductor 1624. A lower portion 1623 of the connection pin 1622 may be designed to be elastic like a spring or to be engaged with an elastic member.

Figure 17A:
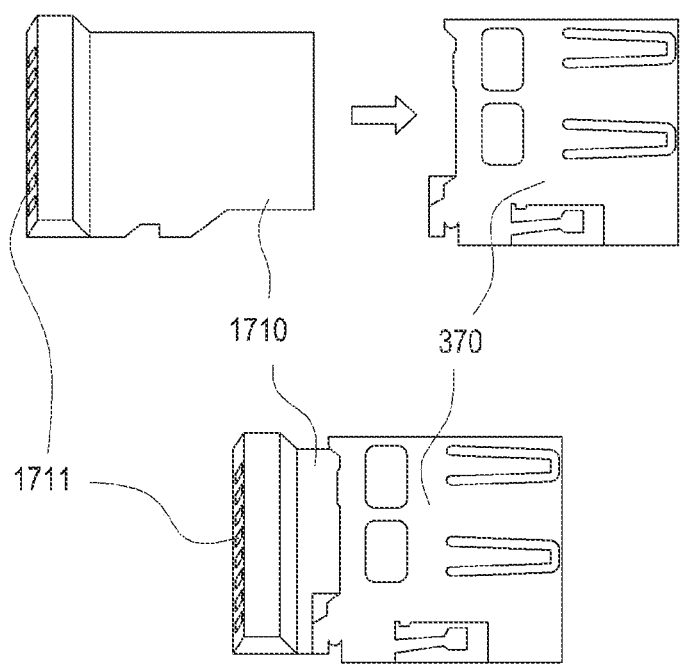
FIGS. 17A, 17B, and 17C illustrate a connector of a flip-type cover and engagement of the connector with a portable electronic device according to another embodiment of the present invention.
Figure 17B:
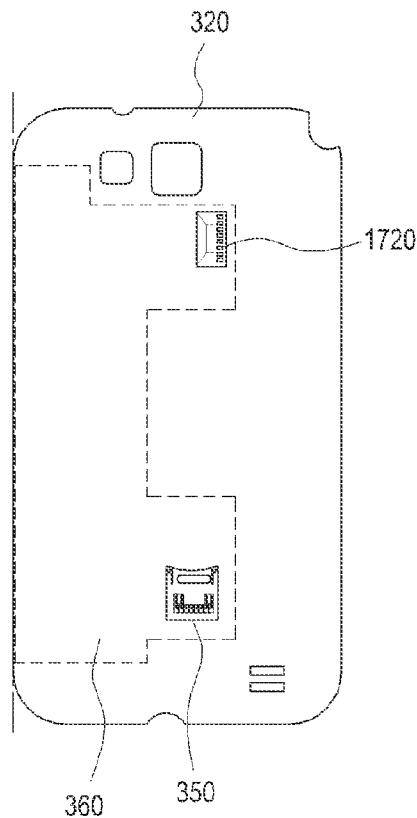
Figure 17C:
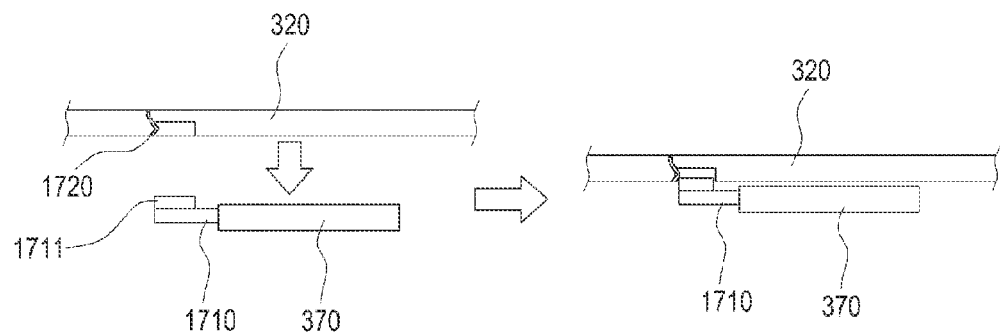

FIGS. 17A, 17B, and 17C illustrate a connector of a flip-type cover and engagement of the connector with a portable electronic device according to another embodiment of the present invention.

The flip-type cover 100 includes the connector 340 that connects the rear-cover PCB 360 to the portable electronic device 200.

The connector 340 corresponds to the socket 370 mounted to the rear surface of the portable electronic device 200. For example, the socket 370 may be a memory card socket such as a micro SD card socket. Hereinbelow, the socket 370 is described as a memory card socket.

The connector 340 includes a bridge 1710 shaped into a memory card so that the bridge 1710 may be inserted into the memory card socket 370, and a plurality of connection pins 1720 installed in the rear-cover PCB 360.

The bridge 1710 includes a plurality of bridge pins 1711 which, when the bridge 1710 is inserted into the memory card socket 370, are brought into contact with the plurality of connection pins 1720, as shown in FIGS. 17B and 17C.

For example, the plurality of connection pins 1720 may be mounted in a groove formed into one surface of the rear cover 320, and the plurality of bridge pins 1711 may be mounted on a protrusion formed on one surface of the bridge 1710 corresponding to the groove.

While not shown, the plurality of connection pins 1720 may be mounted on a protrusion formed on the surface of the rear cover 320 and the plurality of bridge pins 1711 may be mounted in a groove formed in one surface of the bridge 1710 corresponding to the protrusion.

Figure 18A:
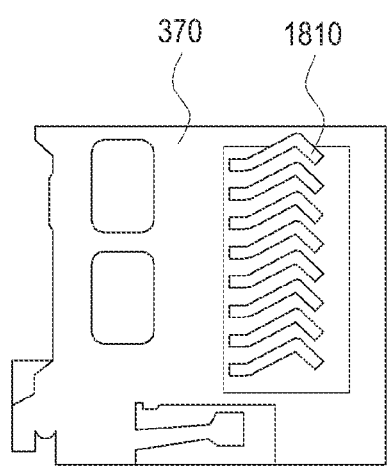
FIGS. 18A, 18B, and 18C illustrate a connector of a flip-type cover and engagement of the connector with a portable electronic device according to another embodiment of the present invention.
Figure 18B:
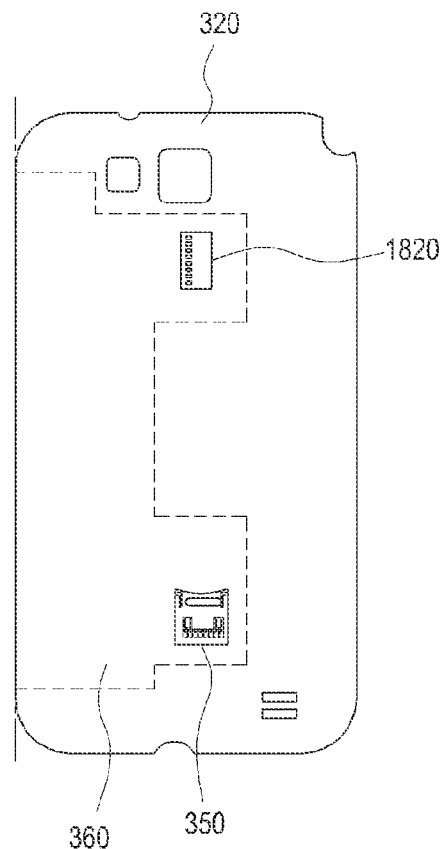
Figure 18C:
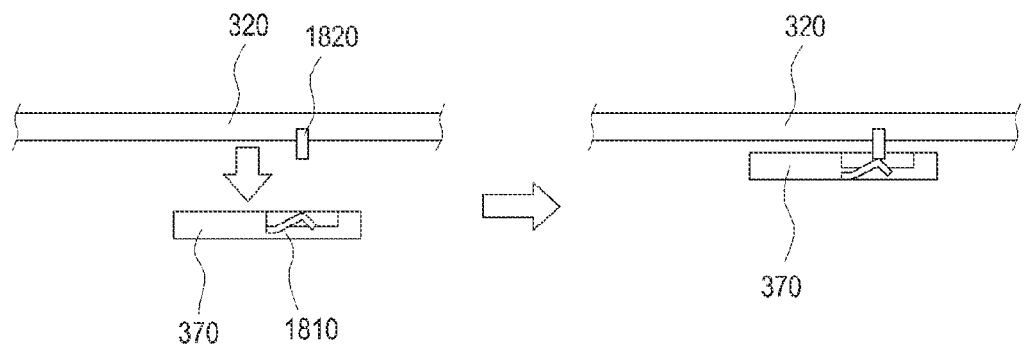

FIGS. 18A, 18B, and 18C illustrate a connector of a flip-type cover and mounting of the connector to a portable electronic device according to another embodiment of the present invention.

The flip-type cover 100 includes the connector 340 that connects the rear-cover PCB 360 to the portable electronic device 200.

The connector 340 corresponds to the socket 370 mounted to the rear surface of the portable electronic device 200. For example, the socket 370 may be a memory card socket such as a micro SD card socket. Hereinbelow, the socket 370 is described as a memory card socket.

Referring to FIG. 18A, the memory card socket 370 of the portable electronic device 200 may accommodate the memory card 455 and include a plurality of socket pins 1810 exposed from the rear surface of the portable electronic device 200.

The connector 340 includes a plurality of connection pins 1820 installed in the rear-cover PCB 360 corresponding to the plurality of socket pins 1810.

The plurality of socket pins 1810 and the plurality of connection pins 1820 may be exposed by being bent or flat or installed in a groove or a protrusion, as illustrated in FIGS. 15A to 17C.

Those skilled in the art will understand that the connection mechanisms between the connector and the socket as described with reference to FIGS. 15A to 18C may be partially modified or used in combination, or a known connection mechanism may be used.

A connection mechanism that does not conform to the SDIO standard may be applied without using the socket 370 of the portable electronic device 200, such as a memory card socket. For example, the flip-type cover 100 may include a predetermined connector (not shown) designed by a manufacturer, for connecting the rear-cover PCB 360 to the portable electronic device 200. The connector may include a plurality of pad-type connection pins, and a plurality of elastic host pins may be formed on the rear surface of the portable electronic device 200. The plurality of connection pins may correspond to the plurality of host pins.

The host pins may protrude from the rear surface of the portable electronic device 200, in connection to the host PCB of the portable electronic device 200. For example, 2 to 9 host pins are provided corresponding to a power supply line, a data communication line, and the like designed by the manufacturer. The plurality of connection pins shaped into flat pads may be exposed on the inner surface of the rear cover 320 of the flip-type cover 100, corresponding to the plurality of host pins. To secure connectivity between the plurality of connection pins of the rear cover 320 and the plurality of host pins of the portable electronic device 200 when the rear cover 320 is mounted to the portable electronic device 200 and the connection pins are brought into contact with the host pins, lower portions of the host pins may be designed to be elastic (vertically on the rear surface of the portable electronic device 200) or to be engaged with elastic members.

Figure 19:
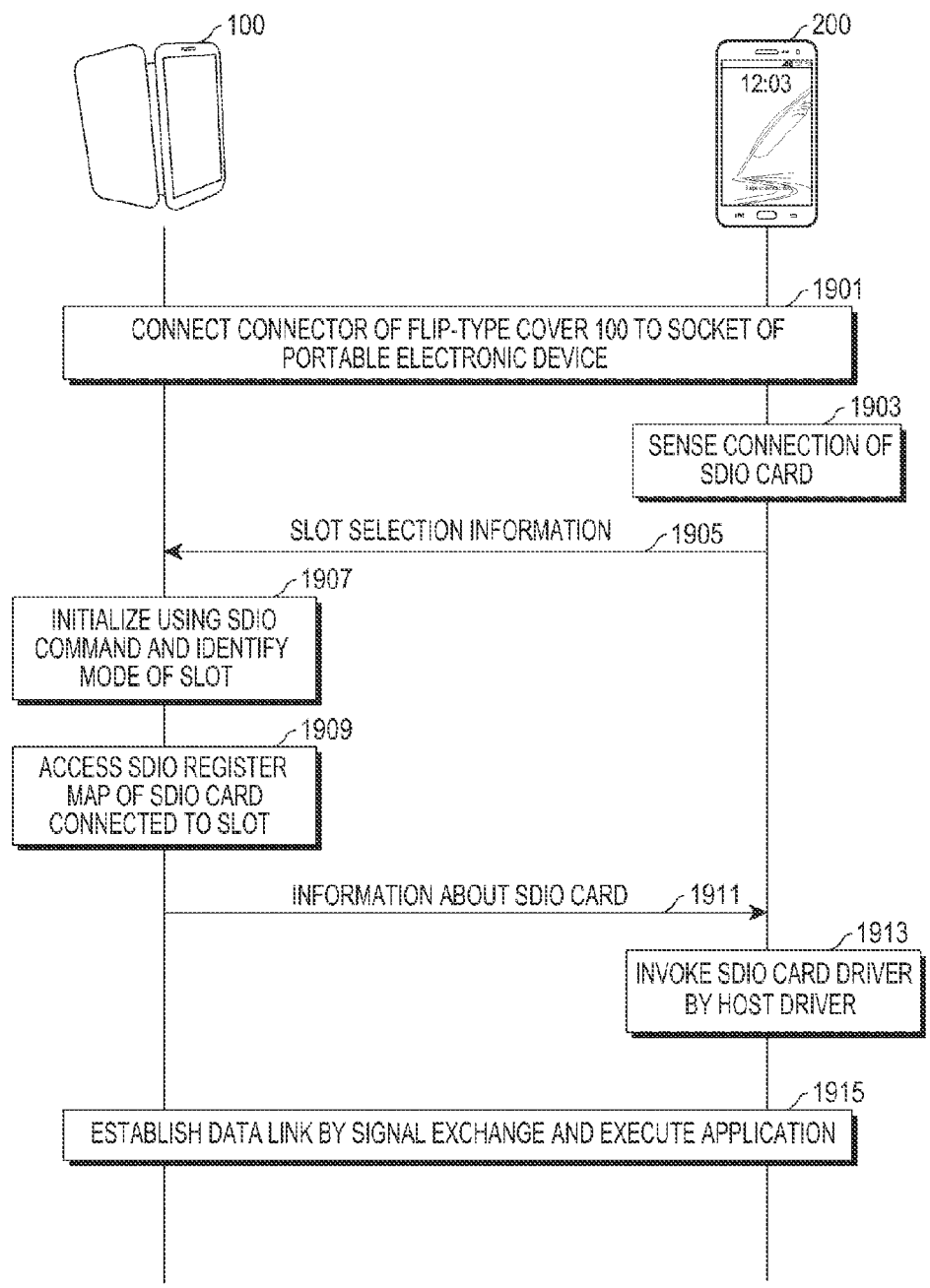
FIG. 19 is a flow diagram illustrating a signal flow for an initialization procedure between a flip-type cover and a portable electronic device according to an embodiment of the present invention.

FIG. 19 is a flow diagram illustrating a signal flow for an initialization procedure between a flip-type cover and a portable electronic device according to an embodiment of the present invention.

Referring to FIG. 19, the flip-type cover 100 is connected electrically or physically to the portable electronic device 200 through the connector of the flip-cover 100 and the socket of the portable electronic device 200 in step 1901. With the portable electronic device 200 powered-on or powered-off, the connector of the flip-cover 100 may be connected to the socket of the portable electronic device 200. If the connector is engaged with the socket physically with the portable electronic device 200 powered-off, and then the portable electronic device 200 is powered-on, the flip-type cover 100 and the portable electronic device 200 transition to an electrical connection state. If the connector is engaged with the socket physically, with the portable electronic device 200 powered-on, functions such as plug-and-play are supported and thus operations according to an embodiment of the present invention may be performed.

When the flip-type cover 100 is connected to the portable electronic device 200, the portable electronic device 200 senses connection to a card/cards (or module/modules) mounted in the flip-type cover 100 in step 1903. For example, the card/cards (or module/modules) may be the display module, the memory card, or at least one I/O module. The following description is given with the appreciation that the card/cards (or module/modules) is/are an SDIO card/cards.

In step 1905, the portable electronic device 200 transmits slot selection information corresponding to a specific SDIO card to initialize a communication connection to the SDIO card to the flip-type cover 100. The controller of the flip-type cover 100 receives the slot selection information from the portable electronic device 200.

The controller of the flip-type cover 100 initializes the SDIO card corresponding to the slot or identifies the mode of the slot in step 1907.

In step 1909, the controller of the flip-type cover 100 acquires information about the SDIO card by accessing the register map of the SDIO card connected to the slot. For example, the information about the SDIO card may include hardware information, identification information, manufacturer information (or manufacturing company information), capability information, or detailed information about the SDIO card.

While steps 1907 and 1909 are separately shown, they may be performed as one operation and the sequence of steps 1907 and 1909 may be changed.

In step 1911, the flip-type cover 100 transmits the information about the SDIO card to the portable electronic device 200. The portable electronic device 200 receives the information about the SDIO card.

Upon receipt of the information about the SDIO card in the portable electronic device 200, the host driver (or bus driver) of the portable electronic device 200 invokes the driver of the SDIO card based on the information about the SDIO card in step 1913.

In step 1915, the portable electronic device 200 establishes a data link by exchanging signals. In addition, the portable electronic device 200 executes an application that controls the SDIO card.

In another embodiment of the present disclosure, a portable electronic device may be configured to include a body corresponding to the portable electronic device 200 and the flip-type cover 100 as a package. A description of the aforedescribed components will be avoided herein.

The portable electronic device includes a housing, a host display screen on a front surface of the housing, a host PCB connected to the host display screen, and the flip-type cover 100 detachably engaged with a rear surface of the housing. That is, the body of the portable electronic device includes the housing, the host display screen on the front surface of the housing, and the host PCB connected to the host display screen.

The flip-type cover 100 includes the front cover 310, the rear cover 320 detachably engaged with the rear surface of the housing, the connection cover 330 that connects the front cover 310 to the rear cover 320, the display screen 145 disposed on the front cover 310, and the rear-cover PCB 360 mounted to the rear cover 310 and connected to the host PCB, for receiving data from the host PCB. When the rear-cover PCB 360 is connected to the host PCB, the rear-cover PCB 360 transmits data received from the host PCB to the display screen 145 of the flip-type cover 100.

The connection cover 330 includes a built-in flexible PCB that connects the display screen 145 to the rear-cover PCB 360.

Data is received from the host PCB via an SDIO interface.

The rear-cover PCB 360 includes the controller 120 that controls transmission of data received from the host PCB to the display screen 145.

The flip-type cover 100 further includes the memory card socket 350 installed in the rear cover 320. The controller 120 switches data received from the host PCB to at least one of the display screen 145 and the memory card socket 350.

The flip-type cover 100 further includes the connector 340 that connects the rear-cover PCB 360 to the host PCB. The connector 340 corresponds to the socket 370 mounted to the rear surface of the housing of the body. The socket 370 may be a memory card socket such as a micro SD card socket.

The connector 340 includes a stub shaped into a memory card, to be inserted into a memory card socket, and at least one of a flexible cable and a flexible PCB that connect the rear-cover PCB 360 to the stub.

The connector 340 includes a bridge shaped into a memory card, to be inserted into a memory card socket, and a plurality of connection pins installed in the rear-cover PCB 360. The bridge includes a plurality of bridge pins that are brought into contact with the plurality of connection pins, when the bridge is inserted into the memory card socket.

The flip-type cover 100 may further include a plurality of connection pins shaped into pads for connecting the rear-cover PCB 360 to the host PCB. The plurality of connection pins correspond to a plurality of elastic host pins mounted in the rear surface of the housing.

The connection cover 330 functions as a hinge by connecting one of the left and right sides of the front cover 310 to one of the left and right sides of the rear cover 320.

The portable electronic device further includes the host controller 230 for controlling display of data on a host display screen and on the display screen 145 of the flip-type cover 100.

The display screen 145 of the flip-type cover 100 corresponds to a display surface of an EPD.

In another embodiment of the present invention, a portable electronic device may be configured to include, for example, the body described as the portable electronic device 200 and the flip-type cover 100 as a package. The portable electronic device is comprised of a package of the body, the flip-type cover 100, and the battery cover 380. The afore-described components will not be described herein.

The portable electronic device includes a housing, a host display screen on a front surface of the housing, the host controller 230 disposed inside the housing, an SDIO memory card socket mounted in a rear surface of the housing, and the flip-type cover 100 detachably engaged with the rear surface of the housing. That is, the body of the portable electronic device includes the housing, the host display screen, the host controller 230, and the memory card socket.

The flip-type cover 100 includes the front cover 310, the rear cover 320 detachably engaged with the rear surface of the housing, the connection cover 330 that connects the front cover 310 to the rear cover 320, the display screen 145 disposed on the front cover 310, and a memory card connector corresponding to the memory card socket.

The host controller 230 controls display of data on a host display screen and the display screen 145 of the flip-type cover 100.

The rear-cover PCB 360 of the flip-type cover 100 may be disposed at a position other than the rear cover 320. For example, a PCB including the controller 120 may be mounted in the front cover 310 or the connection cover 330. The PCB positioned in the front cover 310 or the connection cover 330 may be connected to the connector 340 or the memory card socket 350 via a cable or a flexible PCB.

The rear-cover PCB or the PCB including the controller 120 may not be provided in the flip-type cover 100. For example, the controller 120 or the display module 140 may be implemented on at least one chip or module. At least one chip, at least one module, the socket 350, and the connector 340 may be interconnected by a cable or a flexible PCB. An interface of each card or module (for example, the display interface 130 or the memory card interface 150) may be a cable, a flexible PCB, a demultiplexer, or a multiplexer. The at least one chip, the at least one module, the socket 350, or the connector 340 may be fixed to the flip-type cover 100 by means of a finishing member. It will be understood to those skilled in the art that even though the rear-cover PCB 360 is omitted, as long as, for example, the function blocks of the flip-type cover 100 described with reference to FIG. 8 are included, the portable electronic device 100 and the flip-type cover 100 can be implemented according to an embodiment of the present invention.

The PCB including the controller 120 may be configured separately at the positions of the front cover 310, the rear cover 320, and the connection cover 330.

The memory card socket 350 included in the flip-type cover 100 may be disposed on the inner or outer surface of the front cover 310, the rear cover 320, or the connection cover 330 depending on the manufacturer's design.

Figure 20:
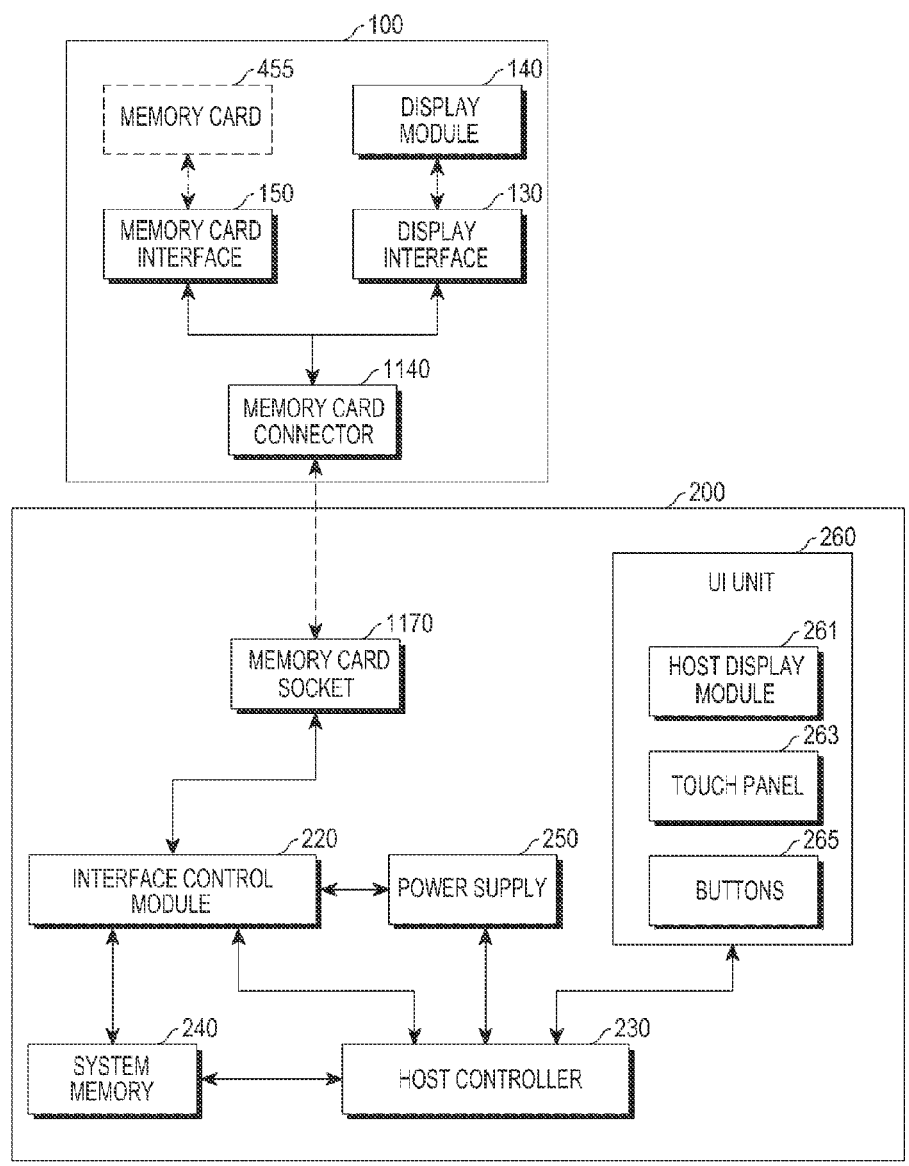
FIG. 20 is a block diagram of a flip-type cover and a portable electronic device according to another embodiment of the present invention.

FIG. 20 is a block diagram of a flip-type cover and a portable electronic device according to another embodiment of the present invention. Components identical to or similar to those illustrated in FIG. 11 will not be described herein.

Referring to FIG. 20, the flip-type cover 100 according to another embodiment of the present invention may not include the controller 120. Thus, the memory card 455 and the display module 140 of the flip cover 100 may be controlled by the host controller 230. That is, the host controller 230 directly controls switching of data received from the portable electronic device 200. 'Direct control' may mean that a specific module/modules is/are not controlled by a second signal generated based on a first signal generated from the host controller 230 by some other controller. In other words, a command signal (or an instruction signal) for a specific module/modules generated by the host controller 230 is transmitted to the specific module/modules without passing through another controller (for example, the controller 120).

FIG. 21 illustrates pin maps for Secure Digital (SD) mode and Serial Peripheral Interface (SPI) mode defined in the SDIO standard along with an embodiment of the present invention.

The connector 340 of the flip-type cover 100 and the memory card socket 1170 of the portable electronic device 200 are constructed to conform to a specific standard for interfacing. The connector 340 including the bridge 1510 illustrated in FIG. 21 is taken as an example to describe embodiments illustrated in FIGS. 20 to 24, without limiting the scope of the present invention. That is, if other embodiments (for example, refer to FIGS. 16A to 18B) follow the SDIO standard, the description of FIGS. 20 to 24 applies to those embodiments as well.

A memory card socket may accommodate a memory card, in conformance with the SDIO standard. The SDIO standard may support 1-bit SD mode, 4-bit SD mode, and Serial Peripheral Interface (SPI) mode and may support 8 slots according to an SDIO interface control module. For example, an SDIO connector and an SDIO memory card socket may connect 1 to 4 data lines, a clock line, a command line, a ground, a power supply line, an interrupt line, and/or the like.

Referring to FIG. 21, the bridge 1510 includes 8 pins 1511 according to the SDIO standard. Operations/functions assigned to the 8 pins 1511 in the 4-bit SD mode and the SPI mode are described in the tables illustrated in FIG. 21. The 8 pins 1511 may be connected electrically to a plurality of connection pins (not shown) mounted in the portable electronic device.

In another embodiment of the present invention, operations/functions may be assigned to pin 1 and pin 8 designated as Reserved (RSV) pins in the flip-type cover and the portable electronic device. For example, a Chip Select (CS) operation/function may be assigned to pin 1 and a voltage level detection operation/function may be assigned to pin 8 so that a connector or a memory card inserted into the memory card socket may be identified. A detected voltage level may be determined to be one of Low (L) and High (H). If the voltage level is L, the host controller 230 determines that the flip-type cover has been connected electrically to the portable electronic device. If the voltage level is H, the host controller 230 determines that a memory card (for example, a Trans (T)-

Flash card) has been inserted. The following description will be given in a case where the CS operation/function is assigned to pin 1 and the voltage detection operation/function is assigned to pin 8, by way of example. To distinguish the operations/functions of pin 1 and pin 2, the operation/function of pin 1 is referred to as 'CS2' and the operation/function of pin 2 is referred to as 'CS1'.

It is further contemplated that the voltage detection operation/function may be assigned to pin 1 and the CS operation/function may be assigned to pin 8.

Figure 22:
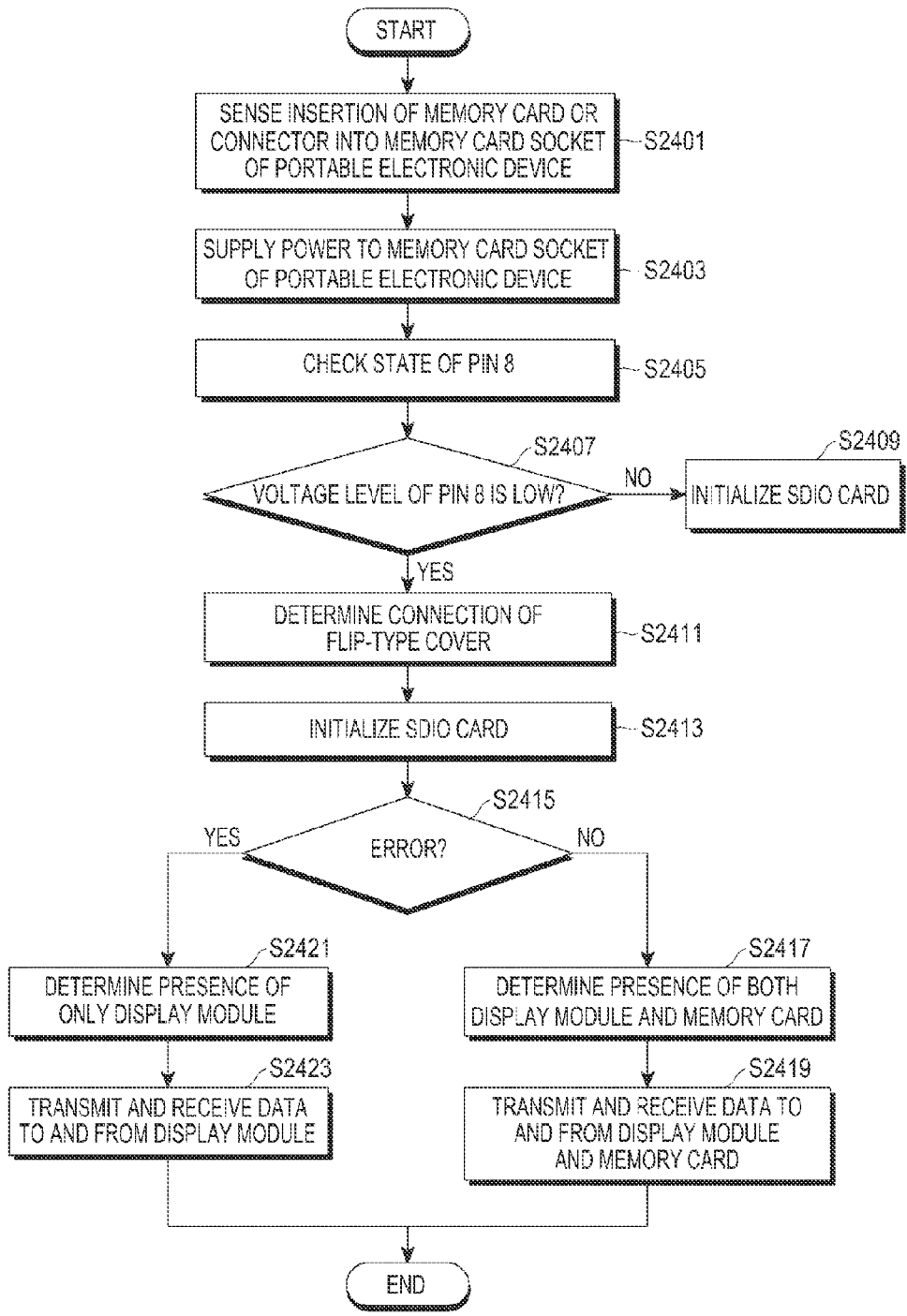
FIG. 22 is a flowchart illustrating a method for controlling a flip-type cover and a portable electronic device according to another embodiment of the present invention.

FIG. 22 is a flowchart illustrating a method for controlling a flip-type cover and a portable electronic device according to another embodiment of the present invention.

Referring to FIG. 22, the host controller 230 detects whether the memory card 455 or the memory card connector 1140 has been inserted into the memory card socket 1170 of the portable electronic device 200 in step S2401. The detection may be performed by a memory card detect pin (not shown) (for example, a T-Flash pin) included in the memory card socket 1170. If a detected voltage level of the memory card detect pin is L, the host controller 230 supplies power to the memory card socket 370 in step S2403. Step S2401 may be an operation of detecting the voltage level of the memory card socket 370 and only then determining the presence of the memory card 455 or the memory card connector 1140 inserted in the memory card socket 370 based on the detected voltage level. Therefore, the purpose of an operation/function performed by the memory card detect pin may be different from that of an operation/function performed by pin 8.

After step S2403, the host controller 230 controls sensing of the state of pin 8 in step S2405. The host controller 230 may detect whether a voltage level of pin 8 is L in step S2407. If the voltage level of pin 8 is L, the host controller 230 determines that the flip-type cover 100 has been engaged with the portable electronic device 200 in step S2411. On the other hand, if the voltage level of pin 8 is H, the host controller 230 determines that the memory card 455 (for example, a T-Flash card) has been inserted in step S2411. In the case of the H voltage level of pin 8, the host controller 230 performs SDIO card initialization for data transmission and reception to and from the inserted memory card in step S2409. The SDIO card initialization may be performed by an initialization algorithm defined in the SDIO standard.

If it is determined that the flip-type cover 100 has been engaged with the portable electronic device 200, the host controller 230 controls an operation/function to determine the presence of the memory card 455 inserted into the memory card socket 350 of the flip-type cover 100. For this purpose, the host controller 230 performs SDIO card initialization in step S2413. The SDIO card initialization may be performed by an initialization algorithm defined in the SDIO standard as in step S2409.

As a result of the SDIO card initialization in step S2413, the host controller 230 determines whether an initialization error has occurred in step S2415.

Figure 23:
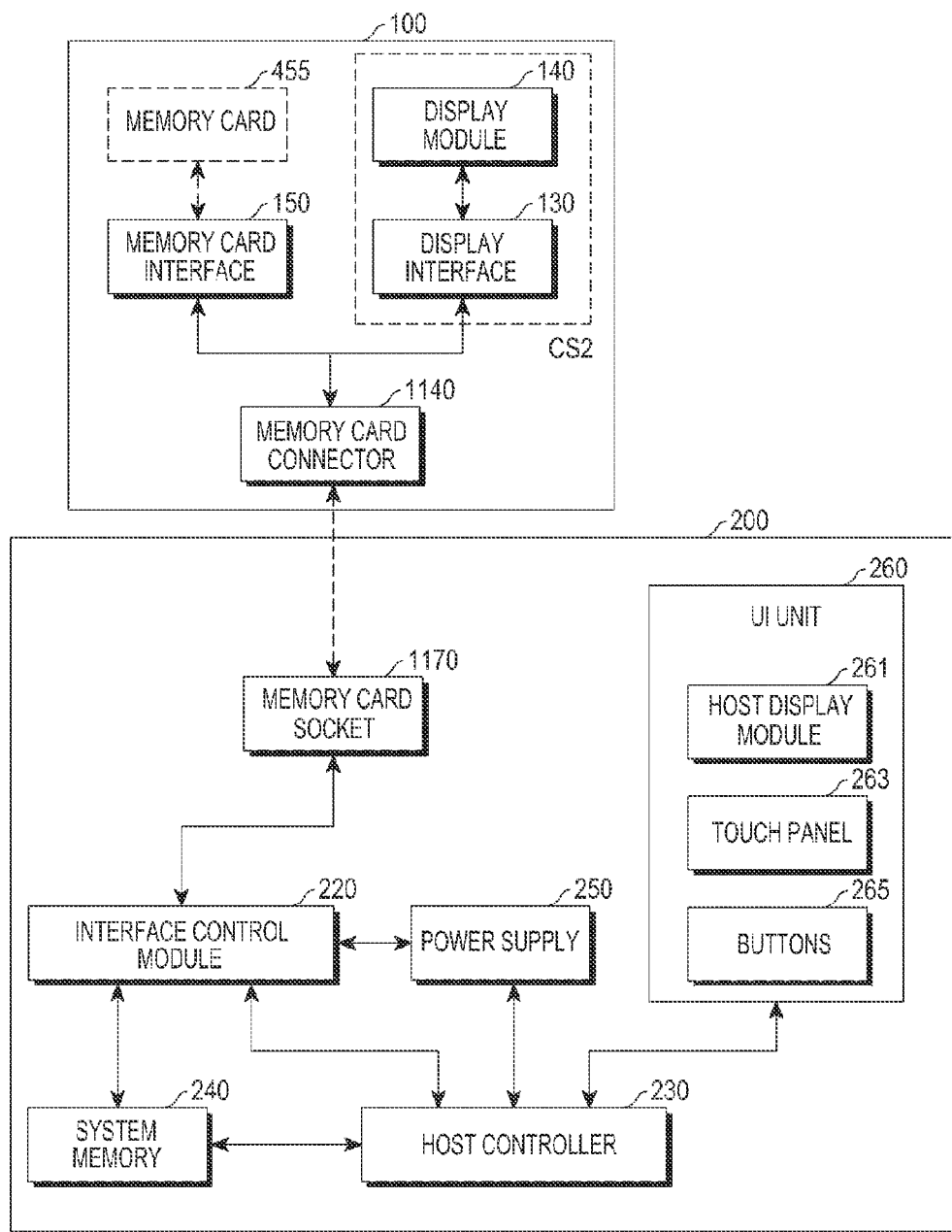
FIG. 23 is a block diagram of a flip-type cover and a portable electronic device and illustrates selection of a display screen of a flip-type cover as a result of initializing an SDIO card.

If an initialization error has occurred, the host controller 230 determines the presence of only the display module in the flip-type cover 100 in step S2421. That is, the host controller 230 determines that a memory card has not been inserted into the memory card socket 350 of the flip-type cover 100. Therefore, in step S2423, the host controller 230 controls communication between the display module 140 and the portable electronic device 200 by CS2 (pin 1), as illustrated in FIG. 23. For this purpose, the host controller 230 controls selection of the display module 140 using CS2 (pin 1) as illustrated in FIG. 23.

Figure 24:
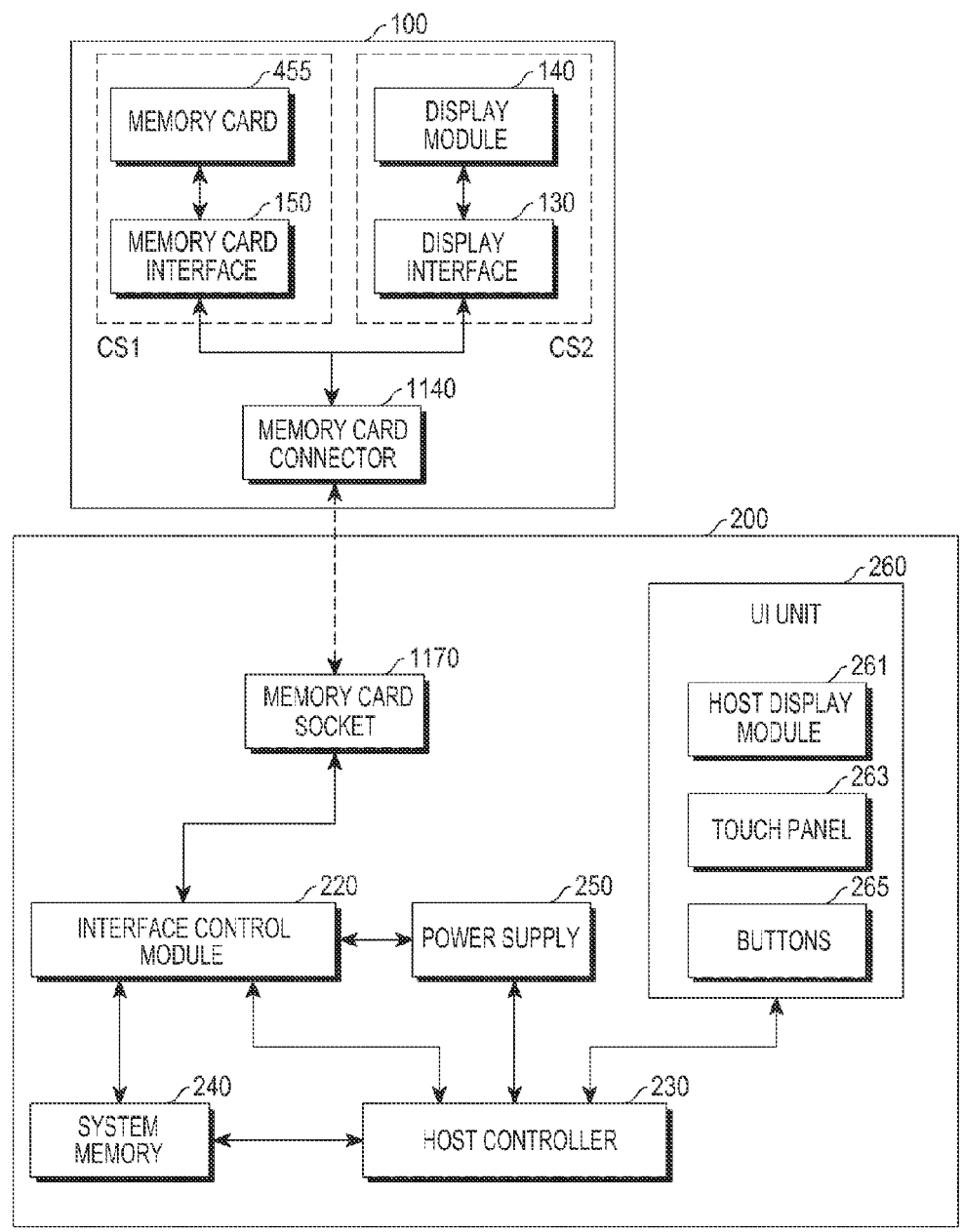
FIG. 24 is a block diagram of a flip-type cover and a portable electronic device and illustrates selection of a display screen and a memory card of a flip-type cover as a result of initializing an SDIO card.

If an initialization error has not occurred in step S2415, the host controller 230 determines the presence of both the display module and the memory card in the flip-type cover 100 in step S2417. That is, the host controller 230 determines that the memory card has been inserted into the memory card socket 350 of the flip-type cover 100. Therefore, in step S2419, the host controller 230 controls communication between the display module 140 and the portable electronic device 200 by CS2 (pin 1), as illustrated in FIG. 24. In addition, the host controller 230 controls communication between the memory card 455 inserted into the memory card socket 350 and the portable electronic device 200 by CS1 (pin 2), as also illustrated in FIG. 24. To communicate with the display module 140, the host controller 230 controls selection of the display module 140 using CS2 (pin 1). In addition, to communicate with the memory card inserted into the memory card socket 350 of the flip-type cover 100, the host controller 230 controls selection of the memory card interface 150 of the flip-type cover 100 using CS1 (pin 2).

According to the embodiments of the present invention illustrated in FIGS. 20 to 24, physical space and fabrication cost can be conserved for the flip-type cover 100 by controlling operations/functions of the flip-type cover 100 through the host controller 230 of the portable electronic device 200.

Those skilled in the art will understand that at least a part of the operations and procedures of components or devices in the embodiments of the present invention described in FIGS. 1A, 1B, and 1C, FIG. 3A, FIGS. 8 to 10, FIG. 19, FIG. 20, and FIGS. 22 to 24 may be implemented in software, hardware, or in combination thereof. The embodiments of the present invention described in FIGS. 1A, 1B, and 1C, FIG. 3A, FIGS. 8 to 10, FIG. 19, FIG. 20, and FIGS. 22 to 24 may be programmed and recorded on a recording medium and may be downloaded to an electronic device or an input unit from a server or a computer over a communication network.

The portable electronic device, flip-type cover of the portable electronic device, and method for controlling the flip-type cover of the present invention may be implemented as computer-readable code in a computer-readable recording medium. The computer-readable recording medium may include any kind of recording device storing computer-readable data. Examples of the recording medium may include Read Only Memory (ROM), Random Access Memory (RAM), optical disk, magnetic tape, floppy disk, hard disk, non-volatile memory, and the like, and may also include a medium that is implemented in the form of carrier waves (for example, transmission over the Internet). In addition, the computer-readable recording medium may be distributed over computer systems connected over the network, and computer-readable codes may be stored and executed in a distributed manner.

As is apparent from the foregoing description, since a display screen is provided on a front surface of the flip-type cover in the portable electronic device, a display function of the portable electronic device is reinforced, thereby increasing use convenience.

As the flip-type cover includes a connector corresponding to a memory card socket of the portable electronic device, the flip-type cover can be readily engaged with the portable electronic device.

Because the flip-type cover is engaged with the portable electronic device by a general-purpose interface of the portable electronic device, no modification or a minimal modification is made to the hardware of the portable electronic device. Consequently, the flip-type cover is cost-effective and provides connection compatibility with various portable electronic devices.

As the flip-type cover extends a plurality of cards or modules by means of an interface used in the portable electronic device, it provides various functions.

Since a rear cover of the flip-type cover is configured to be engaged with the portable electronic device, substituting for a battery cover mounted on the rear surface of the portable electronic device, the volume of the portable electronic device is decreased with installation of the flip-type cover.

Furthermore, the physical space and fabrication cost of the flip-type cover can be reduced by controlling the flip-type cover through a host controller of the portable electronic device, without a controller in the flip-type cover.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A flip-type cover in a portable electronic device, the flip-type cover comprising:
   a first part;
   a second part configured to be detachably engaged with a rear surface of the portable electronic device;
   a connection part configured to connect the first part to the second part;
   a display screen disposed in the first part;
   a rear-cover Printed Circuit Board (PCB) mounted to the second part and connected to the portable electronic device, to receive data from the portable electronic device; and
   a connector configured to connect the rear-cover PCB to the portable electronic device,
   wherein if the flip-type cover is engaged with the portable electronic device, the rear-cover PCB transmits data received from the portable electronic device to the display screen,
   wherein the connector is disposed in correspondence with a memory card socket installed on the rear surface of the portable electronic device,
   wherein the connector comprises:
      a bridge shaped into a memory card to be insertable into the memory card socket; and
      a plurality of connection pins installed on the rear-cover PCB, and
   wherein the bridge includes a plurality of bridge pins to be brought into contact with the plurality of connection pins when the bridge is inserted into the memory card socket.

2. The flip-type cover of claim 1, wherein the connection part includes a built-in flexible PCB to connect the display screen to the rear-cover PCB.

3. The flip-type cover of claim 1, wherein the data is received from the portable electronic device in conformance with a Secure Digital Input Output (SDIO) standard.

4. The flip-type cover of claim 1, wherein the rear-cover PCB includes a controller to control transmission of data received from the portable electronic device to the display screen.

5. The flip-type cover of claim 4,
   wherein the controller switches the data received from the portable electronic device to at least one of the display screen and the memory card socket.

6. The flip-type cover of claim 5, wherein the memory card socket is a Secure Digital (SD) card socket.

7. The flip-type cover of claim 1, wherein each of the plurality of connection pins is bent, protruding from one surface of the rear-cover PCB, and when the bridge is inserted into the memory card socket, each of the plurality of bridge pins is exposed on one surface of the bridge.

8. The flip-type cover of claim 1, wherein each of the plurality of connection pins is exposed on one surface of the rear-cover PCB, and when the bridge is inserted into the memory card socket, each of the plurality of bridge pins is bent, protruding from one surface of the bridge.

9. The flip-type cover of claim 1, wherein the plurality of connection pins are mounted in a groove formed into one surface of the second part, and the plurality of bridge pins are formed on a protrusion extending from one surface of the bridge in correspondence with the groove.

10. The flip-type cover of claim 1, wherein the plurality of connection pins are mounted in a protrusion extending from one surface of the second part, and the plurality of bridge pins are mounted in a groove formed into one surface of the bridge in correspondence with the protrusion.

11. The flip-type cover of claim 1, wherein the memory card socket of the portable electronic device includes a plurality of socket pins exposed from the rear surface of the portable electronic device, and
   wherein the plurality of connection pins are mounted in the rear-cover PCB in correspondence with the plurality of socket pins.

12. The flip-type cover of claim 1, further comprising a plurality of pad-type connection pins configured to connect the rear-cover PCB to the portable electronic device,
   wherein the plurality of pad-type connection pins are disposed in correspondence with a plurality of elastic host pins mounted in the rear surface of the portable electronic device.

13. The flip-type cover of claim 1, wherein if the second part is engaged with the portable electronic device and the first part covers a host display screen of the portable electronic device, the display screen is positioned on a surface of the first part facing the host display screen.

14. The flip-type cover of claim 1, wherein if the second part is engaged with the portable electronic device and the first part covers a host display screen of the portable electronic device, the display screen is positioned on an exposed surface of the first part.

15. The flip-type cover of claim 1, wherein the display screen is disposed on both surfaces of the first part.

16. The flip-type cover of claim 1, wherein the connection part functions as a hinge by connecting one of left and right sides of the first part to one of left and right sides of the second part.

17. The flip-type cover of claim 1, wherein the connection part functions as a hinge by connecting one of top and bottom sides of the first part to one of top and bottom sides of the second part.

18. The flip-type cover of claim 1, wherein at least a part of the rear-cover PCB is exposed from one surface of the second part.

19. The flip-type cover of claim 1, wherein the display screen is a display surface of an ElectroPhoretic Display (EPD).

20. A portable electronic device comprising:
   a housing;
   a host display screen disposed on a front surface of the housing;
   a host Printed Circuit Board (PCB) connected to the host display screen; and
   a flip-type cover configured to be detachably engaged with a rear surface of the housing,
   wherein the flip-type cover comprises:

a first part;
a second part configured to be detachably engaged with the rear surface of the housing;
a connection part configured to connect the first part to the second part;
a display screen disposed in the first part;
a rear-cover Printed Circuit Board (PCB) mounted to the second part and connected to the host PCB, to receive data from the portable electronic device, wherein if the flip-type cover is engaged with the host PCB, the rear-cover PCB transmits data received from the host PCB to the display screen,
wherein the flip-type cover further comprises a connector configured to connect the rear-cover PCB to the host PCB,
wherein the connector is disposed in correspondence with a memory card socket installed on the rear surface of the housing,
wherein the connector comprises:
a bridge shaped into a memory card to be insertable into the memory card socket; and
a plurality of connection pins mounted in the rear-cover PCB, and
wherein the bridge includes a plurality of bridge pins to be brought into contact with the plurality of connection pins when the bridge is inserted into the memory card socket.

21. The portable electronic device of claim 20, wherein the connection part includes a built-in flexible PCB to connect the display screen to the rear-cover PCB.

22. The portable electronic device of claim 20, wherein the data is received from the host PCB in conformance with a Secure Digital Input Output (SDIO) standard.

23. The portable electronic device of claim 20, wherein the rear-cover PCB includes a controller configured to control transmission of data received from the host PCB to the display screen.

24. The portable electronic device of claim 23, wherein the flip-type cover further comprises a second memory card socket mounted to the second part, and the controller switches the data received from the host PCB to at least one of the display screen and the second memory card socket.

25. The portable electronic device of claim 20, wherein the connector comprises:
a stub shaped into a memory card to be insertable into the memory card socket; and
at least one of a flexible cable and a flexible PCB to connect the rear-cover PCB to the stub.

26. The portable electronic device of claim 20, wherein the flip-type cover further comprises a plurality of pad-type connection pins configured to connect the rear-cover PCB to the host PCB, and the plurality of pad-type connection pins are disposed in correspondence with a plurality of elastic host pins formed on the rear surface of the housing.

27. The portable electronic device of claim 20, wherein the connection part functions as a hinge by connecting to one of left and right sides of the first part to one of left and right sides of the second part.

28. The portable electronic device of claim 20, further comprising a host controller configured to control display of data on the host display screen and the display screen of the flip-type cover.

29. The portable electronic device of claim 20, wherein the display screen is a display surface of an ElectroPhoretic Display (EPD).

30. The portable electronic device of claim 20, wherein the first part of the flip-type cover overlays the host display screen disposed on the front surface of the housing of the portable electronic device when the flip-type cover is closed.

31. A portable electronic device comprising:
a housing;
a host display screen disposed on a front surface of the housing;
a host controller inside the housing;
a Secure Data Input Output (SDIO) memory card socket mounted on a rear surface of the housing; and
a flip-type cover configured to be detachably engaged with the rear surface of the housing,
wherein the flip-type cover comprises:
a first part;
a second part configured to be detachably engaged with the rear surface of the housing;
a connection part configured to connect the first part to the second part;
a display screen disposed in the first part;
a rear-cover Printed Circuit Board (PCB) mounted to the second part and connected to the portable electronic device, to receive data from the portable electronic device, wherein if the flip-type cover is engaged with the portable electronic device, the rear-cover PCB transmits data received from the portable electronic device to the display screen; and
a memory card connector disposed in correspondence with the memory card socket,
wherein the host controller controls display of data on the host display screen and the display screen of the flip-type cover,
wherein the memory card connector comprises:
a bridge shaped into a memory card to be insertable into the memory card socket; and
a plurality of connection pins installed on the rear-cover PCB, and
wherein the bridge includes a plurality of bridge pins to be brought into contact with the plurality of connection pins when the bridge is inserted into the memory card socket.

32. A flip-type cover in a portable electronic device, the flip-type cover comprising:
a first part;
a second part connected to the first part and configured to be detachably engaged with a rear surface of the portable electronic device;
a rear-cover Printed Circuit Board (PCB) mounted to the second part and connected electrically to the portable electronic device, to receive data from the portable electronic device;
a display screen disposed in the first part, wherein the received data is switched to at least one of the display screen disposed in the first part and a memory card mounted to the second part by a host controller of the portable electronic device; and
a connector configured to connect the rear-cover PCB to the portable electronic device, wherein the connector is disposed in correspondence with a memory card socket installed on the rear surface of the portable electronic device,
wherein the connector comprises:
a bridge shaped into a memory card to be insertable into the memory card socket; and
a plurality of connection pins installed on the rear-cover PCB, and wherein the bridge includes a plurality of bridge pins to be brought into contact with the plurality of connection pins when the bridge is inserted into the memory card socket.

33. The flip-type cover of claim 32, wherein the data is received from the portable electronic device in conformance with a Secure Digital Input Output (SDIO) standard.

34. The flip-type cover of claim 32, wherein the host controller determines through the connector whether the rear-cover PCB is connected electrically to the portable electronic device.

35. The flip-type cover of claim 32, wherein the host controller determines through the connector whether the rear-cover PCB is connected electrically to the portable electronic device based on a voltage level detected using a predetermined pin from among reserved pins defined in the SDIO standard.

36. The flip-type cover of claim 35, wherein if the detected voltage level is Low (L), the host controller determines that the rear-cover PCB is connected electrically to the portable electronic device.

37. The flip-type cover of claim 36, wherein if the detected voltage level is L, the host controller performs SDIO card initialization.

38. The flip-type cover of claim 37, wherein if the host controller determines that an initialization error has occurred as a result of the SDIO card initialization, the host controller controls data transmission and reception to and from the display screen in Serial Peripheral Interface (SPI) mode.

39. The flip-type cover of claim 37, wherein if the host controller determines that an initialization error has not occurred as a result of the SDIO card initialization, the host controller controls data transmission and reception to and from the display screen and a memory card inserted into a memory card socket mounted on the second part in SPI mode.

40. The flip-type cover of claim 35, wherein if the detected voltage level is High (H), the host controller determines that a memory card has been inserted into a memory card socket mounted to the portable electronic device.

41. The flip-type cover of claim 40, wherein the host controller controls data transmission and reception to and from the memory card inserted into the memory card socket mounted to the portable electronic device in Secure Digital (SD) mode or SPI mode.

42. A method for controlling a flip-type cover in a portable electronic device, the method comprising:
   detecting a voltage level of a connector of the flip-type cover inserted into a memory card socket of the portable electronic device;
   determining that a device that has been inserted into the memory card socket is the connector, from among a group of devices including a memory card and the connector, based on the detected voltage level; and
   determining a data transmission mode based on a Secure Digital Input Output (SDIO) standard according to the determination,
   wherein the connector is configured to connect a rear-cover PCB mounted to a second part of the flip-type cover to the portable electronic device,
   wherein the connector is disposed in correspondence with the memory card socket installed on the rear surface of the portable electronic device,
   wherein the connector includes a bridge shaped into a form of a memory card to be insertable into the memory card socket, and further includes a plurality of connection pins installed on the rear-cover PCB, and
   wherein the bridge includes a plurality of bridge pins to be brought into contact with the plurality of connection pins when the bridge is inserted into the memory card socket.

43. The method of claim 42, wherein determining the data transmission mode comprises, if the connector has been inserted, setting the data transmission mode to Serial Peripheral Interface (SPI) mode.

44. The method of claim 42, wherein detecting the voltage level comprises detecting the voltage level using a predetermined pin from among reserved pins defined in the SDIO standard.

45. The method of claim 42, wherein determining whether the memory card or the connector has been inserted comprises, if the detected voltage level is Low (L), determining that the connector of the flip-type cover has been inserted into the memory card socket.

46. The method of claim 45, wherein determining the data transmission mode comprises setting the data transmission mode to SPI mode.

47. The method of claim 42, wherein determining whether the memory card or the connector has been inserted comprises, if the detected voltage level is High (H), determining that the memory card has been inserted into the memory card socket.

48. The method of claim 47, wherein determining the data transmission mode comprises setting the data transmission mode to Secure Digital (SD) mode or SPI mode.

49. The method of claim 42, further comprising, after the data transmission mode is determined when the connector of the flip-type cover has been inserted, performing SDIO card initialization.

50. The method of claim 49, further comprising, if it is determined that an initialization error has occurred as a result of the SDIO card initialization, performing data transmission and reception to and from a display screen of the flip-type cover in SPI mode.

51. The method of claim 49, further comprising, if it is determined that an initialization error has not occurred as a result of the SDIO card initialization, performing data transmission and reception to and from a display screen and a memory card of the flip-type cover in SPI mode.

52. The method of claim 42, wherein the flip-type cover comprises:
   a first part;
   the second part connected to the first part and configured to be detachably engaged with a rear surface of the portable electronic device;
   the rear-cover Printed Circuit Board (PCB) mounted to the second part and connected electrically to the portable electronic device, to receive data from the portable electronic device; and
   a display screen disposed in the first part.

* * * * *